United States Patent [19]

Hayashi et al.

[11] Patent Number: 4,918,686
[45] Date of Patent: Apr. 17, 1990

[54] DATA TRANSFER NETWORK SUITABLE FOR USE IN A PARALLEL COMPUTER

[75] Inventors: Takehisa Hayashi, Tokyo; Koichiro Omada, Kanagawa; Teruo Tanaka, Tokyo; Naoki Hamanaka, Tokyo; Shigeo Nagashima, Tokyo, all of Japan

[73] Assignee: Hitachi, Ltd., Tokyo, Japan

[21] Appl. No.: 224,894

[22] Filed: Jul. 27, 1988

[30] Foreign Application Priority Data

Jul. 27, 1987 [JP] Japan .................. 62-185479

[51] Int. Cl.⁴ ........................................... H04Q 11/04
[52] U.S. Cl. ..................................................... 370/60
[58] Field of Search ............................ 370/60, 94, 58

[56] References Cited

U.S. PATENT DOCUMENTS

| | | | |
|---|---|---|---|
| 4,491,945 | 1/1985 | Turner | 370/60 |
| 4,638,475 | 1/1987 | Koike | 370/60 |
| 4,698,628 | 10/1987 | Herkert et al. | 370/60 |
| 4,703,475 | 10/1987 | Dretzka et al. | 370/60 |

FOREIGN PATENT DOCUMENTS 63-124162 5/1988 Japan .

OTHER PUBLICATIONS

Agarwal et al., Evaluating the Performance of Multicomputer Configurations, IEEE Computer, vol. 19, No. 5, pp. 23-37, 1986.
Dennis et al., Building Blocks for Data Flow Prototypes, Conference Proceedings, "The 7th Annual Symposium on Computer Architecture", vol. 8, No. 3, May, 1980, pp. 1-8, 1980.
Siegel et al., The Multistage Cube: A Versatile Interconnection Network, IEEE Computer, vol. 14, No. 12, pp. 65-76, 1981.
McMillen et al., Performance and Implementation of 4×4 Switching Nodes in an Interconnection Network for PASM Proceedings of 1981 International Conference on Parallel Processing, pp. 229-233, 1981.
Dias et al., Analysis and Simulation of Buffered Delta Networks IEEE Transactions on Computers, vol. C-30, no. 4, pp. 273-282, Apr. 1981.
Chen et al., Interconnection Network Using Shuffles IEEE Computer, vol. 14, No. 12, pp. 55-64, 1981.
Suzuoka et al., Toward A Parallel Processing System for AI Proceedings of 35th National Meeting of Information Processing Society of Japan, pp. 135-136, (Sep., 1987).
Feng, T., "A Survey of Interconnection Networks", IEEE Computer, vol. 14, No. 12, Dec., 1981, pp. 12-27.

Primary Examiner—Joseph A. Orsino
Assistant Examiner—Frank M. Scutch, III
Attorney, Agent, or Firm—Fay, Sharpe, Beall, Fagan, Minnich & McKee

[57] ABSTRACT

In a data transfer network of the present invention, each switch is designed such that when the partial address necessary for a given switch to determine another switch belonging to the succeeding stage, to which a packet is to be delivered from the given switch, is included in the first one of plural subpackets supplied to the given switch and each having the partial address, the given switch starts its switching operation upon arrival of the first subpacket. In a preferred embodiment, when the partial address necessary for the succeeding switch to make its switching operation is not included in the first subpacket, the partial addresses are exchanged between the subpackets by the preceding switch so that the said partial address is now included in the first subpacket.

6 Claims, 18 Drawing Sheets

FIG. 4

| SWITCH COORDI-NATE | INPUT PORT OF A SWITCH | TARGET ADDRESS | | | | OUTPUT PORT OF A SWITCH |
|---|---|---|---|---|---|---|
| | | INPUT | | OUTPUT | | |
| | | 1ST SUBPACKET | 2ND SUBPACKET | 1ST SUBPACKET | 2ND SUBPACKET | |
| [00] | $I_2$ | *10 ($A_1$) | 11 ($A_2$) | 10 ($A_1$) | 11 ($A_2$) | $O_2$ |
| [14] | $I_1$ | 10* ($A_1$) | 11 ($A_2$) | 10 ($A_1$) | 11 ($A_2$) | $O_1$ |
| [24] | $I_1$ | 10 ($A_1$) | *11 ($A_2$) | 10 ($A_1$) | 11 ($A_2$) | $O_2$ |
| [35] | $I_1$ | 10 ($A_1$) | 11* ($A_2$) | 10 ($A_1$) | 11 ($A_2$) | $O_2$ |

∗ ⋯ POSITION OF A JUDGE BIT

FIG. 8

| SWITCH COORDI-NATE | INPUT PORT OF A SWITCH | TARGET ADDRESS | | | | OUTPUT PORT OF A SWITCH |
|---|---|---|---|---|---|---|
| | | INPUT | | OUTPUT | | |
| | | 1ST SUBPACKET | 2ND SUBPACKET | 1ST SUBPACKET | 2ND SUBPACKET | |
| [00]' | $I_2$ | *10 ($A_1$) | 11 ($A_2$) | 10 ($A_1$) | 11 ($A_2$) | $O_2$ |
| [14]' | $I_1$ | 10* ($A_1$) | 11 ($A_2$) | 11 ($A_2$) | 10 ($A_1$) | $O_1$ |
| [24]' | $I_1$ | *11 ($A_2$) | 10 ($A_1$) | 11 ($A_2$) | 10 ($A_1$) | $O_2$ |
| [35]' | $I_1$ | 11* ($A_2$) | 10 ($A_1$) | 11 ($A_2$) | 10 ($A_1$) | $O_2$ |

∗ ⋯ POSITION OF A JUDGE BIT

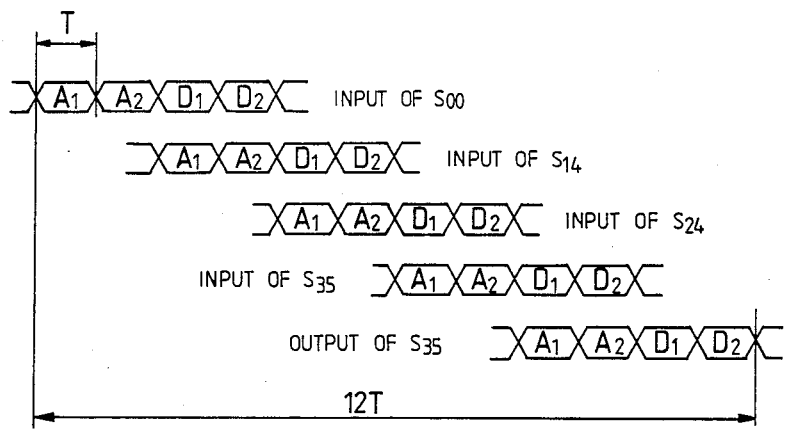
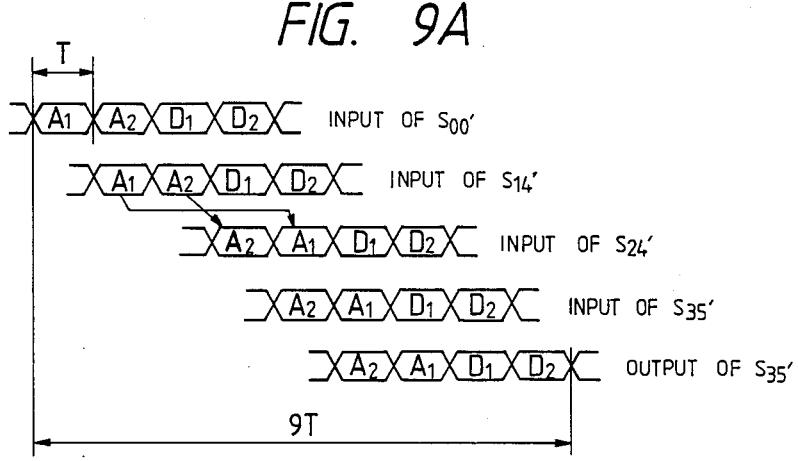
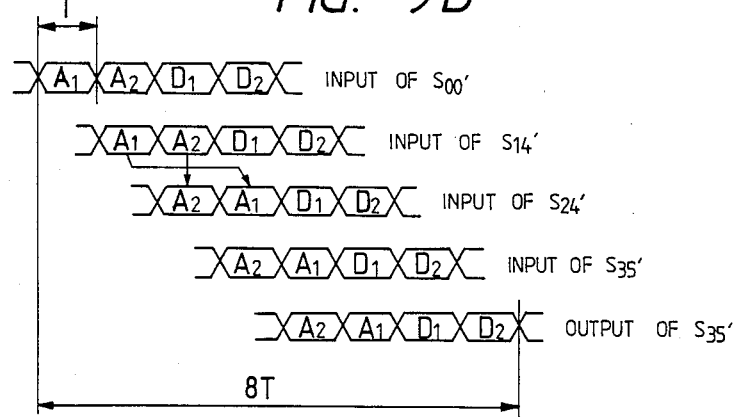

FIG. 7A
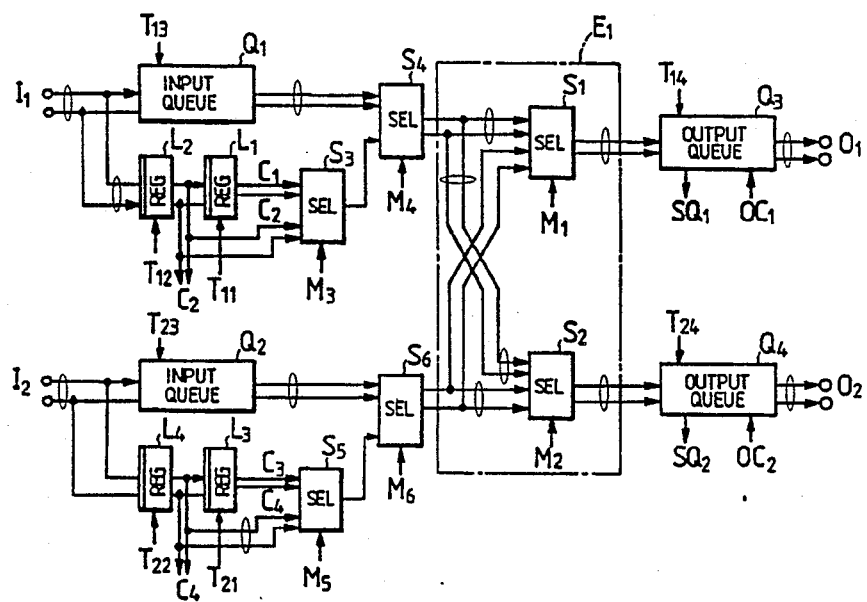
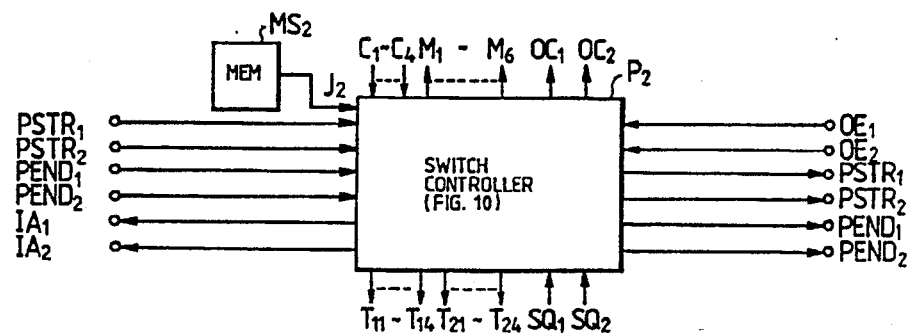

FIG. 7B
$S_{\infty}'$ (or $S_{24}'$ or $S_{35}'$)
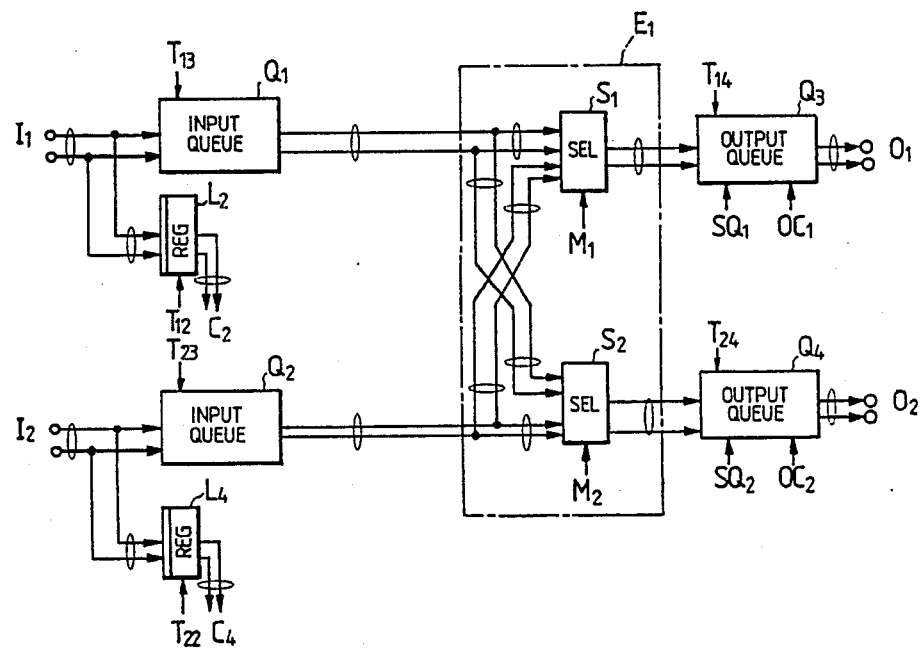
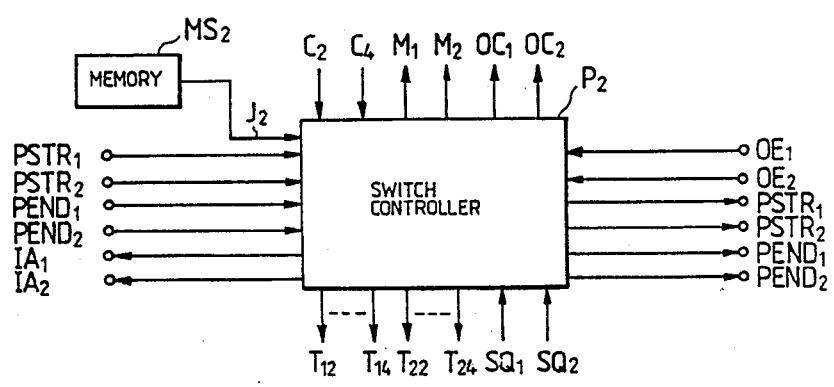

FIG. 12
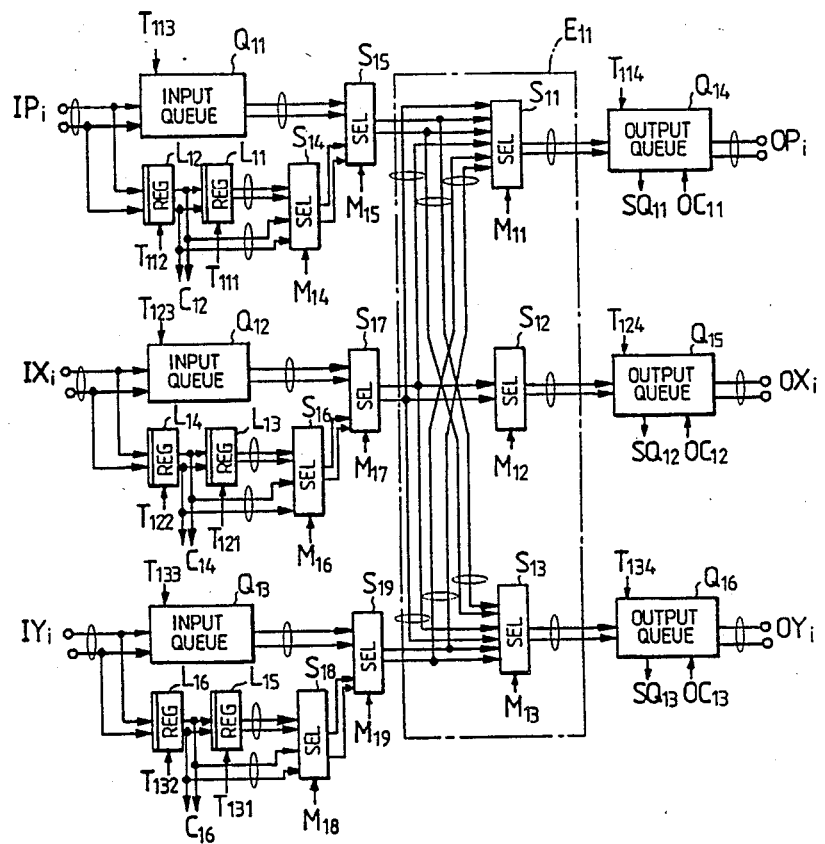
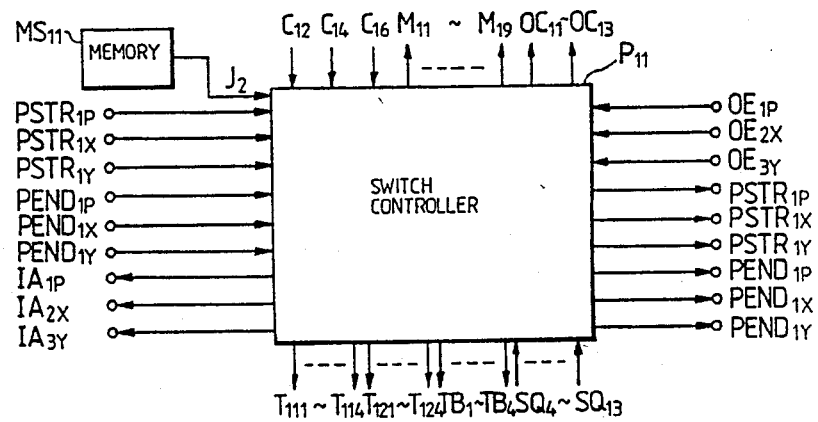

FIG. 14A

180A — TRANSFER THE PACKET TO A SWITCH $EX_{mn}$ WHOSE Y ADDRESS n IS EQUAL TO $A_2$ AFTER EXCHANGING $A_2$ AND $A_1$ AT THE TIMING OF THE TRANSFER

FIG. 14B

180B — TRANSFER THE PACKET TO A SWITCH $EX_{mn}$ WHOSE X ADDRESS m IS EQUAL TO $A_1$ AFTER EXCHANGING $A_1$ AND $A_2$ AT THE TIMING OF THE TRANSFER

FIG. 14C

162 — RECEIVE A PACKET FROM NX VIA INPUT PORT IX

164 — $A_1$ = X ADDRESS OF THE SWITCH?

166 (=) — SEND THE PACKET TO A PROCESSOR VIA OUTPUT PORT OP 170 (≠) — SEND THE PACKET TO NY VIA OUTPUT PORT OY

FIG. 14D

152 — RECEIVE A PACKET FROM NY VIA INPUT PORT IY

154 — $A_2$ = Y ADDRESS OF THE SWITCH?

156 (=) — SEND THE PACKET TO A PROCESSOR VIA OUTPUT PORT OP 160 (≠) — SEND THE PACKET TO NX VIA OUTPUT PORT OX

L: LOCAL ADDRESS BIT
(0 AT TRANSMISSION START)
L=0 → STORE GLOBAL ADDRESS $A_G$
L=1 → STORE LOCAL ADDRESS $A_L$

NOTES
$A_G$ : TARGET GLOBAL ADDRESS
$A_L$ : TARGET LOCAL ADDRESS
$A_{Gi}$ : GLOBAL ADDRESS OF A PROCESSING NODE i
$A_{Li}$ : LOCAL ADDRESS OF A PROCESSING NODE i

DATA TRANSFER NETWORK SUITABLE FOR USE IN A PARALLEL COMPUTER

BACKGROUND OF THE INVENTION

The present invention relates to a data transfer network for transferring data in the form of packets.

With recent progress of the LSI technology, a parallel computer system with high performance has become possible by interconnecting a number of high-speed, large-capacity processors and carrying out the parallel processing. In such a system, a large amount of data requires to be transferred among processors, between processors and memories, and so on. Therefore, a data transfer network as shown in FIG. 1A, for example, is required for interconnecting processors. Conventional methods of arranging data transfer networks are explained in detail, for example, in an article by Tse-yun Feng, "A survey of interconnection network", IEEE Trans. Computers Vol C-14, No. 12, pp. 12-27 (1981).

There are known data transfer networks using crossbar switches or multi-staged switches. In these systems, the data to be transferred is added with the target address, and then delivered into the data transfer network in the form of packets. In response to the packets, transmission paths are sequentially created in the network.

In case of the data transfer network composed of crossbar switches, the required amount of hardware becomes enormous and such a network is difficult to implement in practice. Therefore, the system using multi-staged switches is more realistic. In this case, the length of data is normally more than several bits, and the target address also requires more than several bits when several thousands or more processors are employed. It is of course desired that the whole bits of each packet are transferred in parallel for high-speed transfer of the packets. However, if the system is designed to transfer the whole bits of each packet in parallel, the numbers of signal lines and switches would become very large. Meanwhile, the data transfer path inherently has a relatively small bit width d (as much as 10 or less bits). From the viewpoint of practice, therefore, it is more advantageous to divide each of packets into a plurality of subpackets each composed of plural bits d, as shown in FIG. 1B, so that the whole bits in each subpacket are transferred in parallel, while different packets are sequentially transferred. In addition to data, the target address also requires to be divided into at least two or more partial addresses.

Each of multi-staged switches jointly constituting a data transfer network judges the destination of the packet input thereto based on the target address included in the packet, and then makes proper switching operation for delivering the packet to the appropriate output port. Even when the data and target address are divided as mentioned above, such switching operation can be made by each switch after waiting for arrival of all the partial addresses. Once switching is established, data subpackets which are sequentially transmitted following the target address, can now be pipelined to the succeeding switch. However, if each switch makes its switching operation after waiting for all the partial addresses, there would give rise a problem that the start time of switching is delayed to a larger extent than with the case where the whole bits of the target address are transferred in parallel.

SUMMARY OF THE INVENTION

It is an object of the present invention to provide a data transfer network in which each switch can start its switching operation with no significant delay, even when the target address is divided into a plurality of partial addresses.

According to the present invention, therefore, each switch is designed such that when the partial address necessary for a given switch to determine another switch belonging to the next stage, to which a packet is to be delivered from the given switch, is included in the first one of plural subpackets supplied to the given switch and each having the partial address, the given switch starts its switching operation upon arrival of the first subpacket. In a preferred embodiment, when the partial address necessary for the succeeding switch to make its switching operation is not included in the first subpacket, the partial addresses are exchanged between the subpackets by the preceding switch so that the said partial address is now included in the first subpacket.

BRIEF DESCRIPTION OF THE DRAWINGS

FIG. 4 is a table for explaining operation of the switch in the network of FIG. 2;

FIG. 5 is a timing chart for explaining operation of the switch in the network of FIG. 2;

FIG. 7A is a block diagram of a switch (S14', etc.) belonging to the second stage in the network of FIG. 6;

FIG. 7B is a block diagram of a switch (S00', S24' or S35') belonging to the first, second or fourth stage in the network of FIG. 6;

FIG. 8 is a table for explaining operation of the switch in the network of FIG. 6;

FIG. 9A is a timing chart for explaining one example of operation of the network of FIG. 6;

FIG. 9B is a timing chart for explaining another example of operation of the network of FIG. 6;

FIG. 12 is a block diagram of a switch (EXij) for used in the network of FIG. 11;

FIG. 14A is a flow chart showing improved operation of an X partial network (NXj) in the network of FIG. 12;

FIG. 14B is a flow chart showing improved operation of a Y partial network (NYi) in the network of FIG. 12;

FIG. 14C is a flow chart showing improved operation of the switch (EXij) for use in the network of FIG. 12 at the time it receives a packet from the Y partial network (NYi);

FIG. 14D is a flow chart showing improved operation of the switch (EXij) for use in the network of FIG. 12 at the time it receives a packet from the X partial network (NYj);

DETAILED DESCRIPTION OF EMBODIMENTS

Prior to detailed description of embodiments of the present invention, there will be explained an example of a data transfer network previously contemplated by the inventors in which the target address is divided into partial addresses, but speed-up of switching operation obtainable with the present invention is not effected, with reference to FIG. 2.

Figure 2:
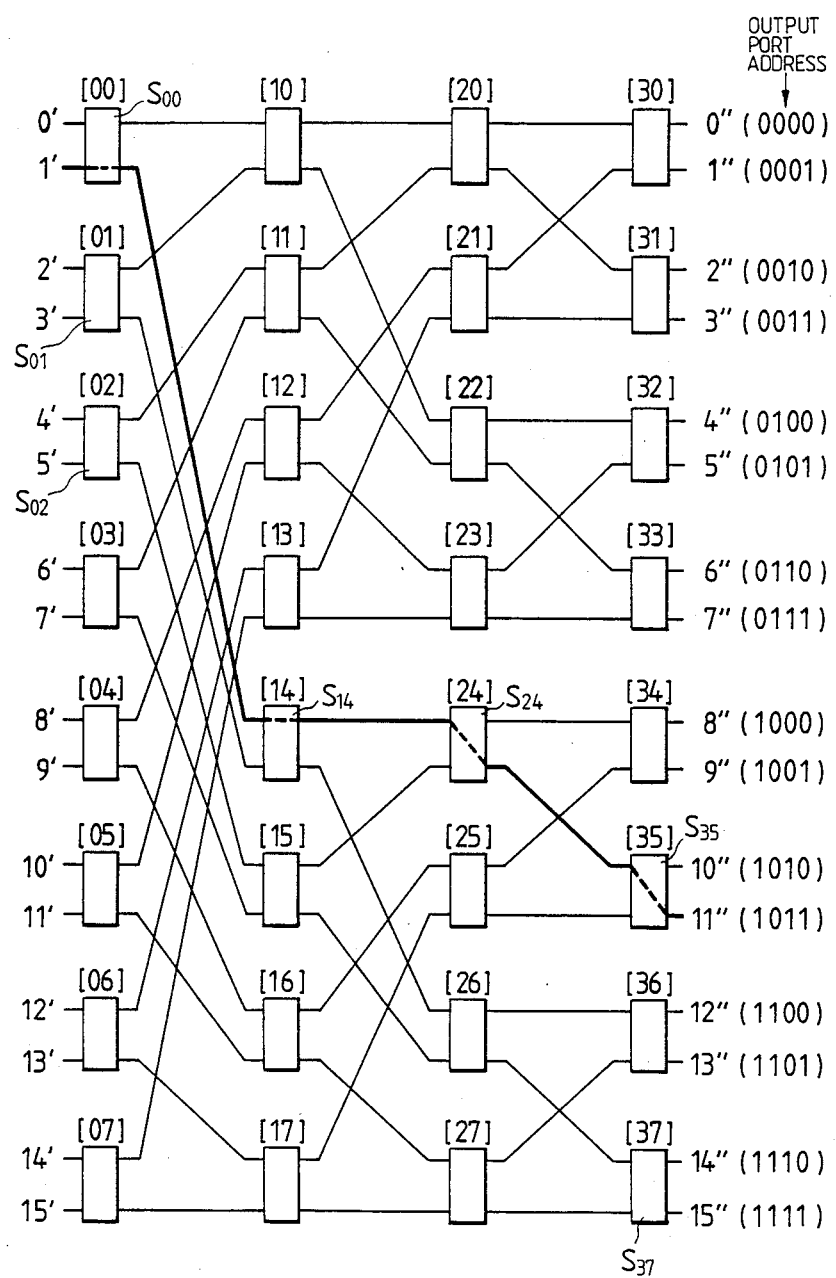
FIG. 2 is a block diagram of a low-speed data transfer network for comparison with the present invention.
Figure 3:
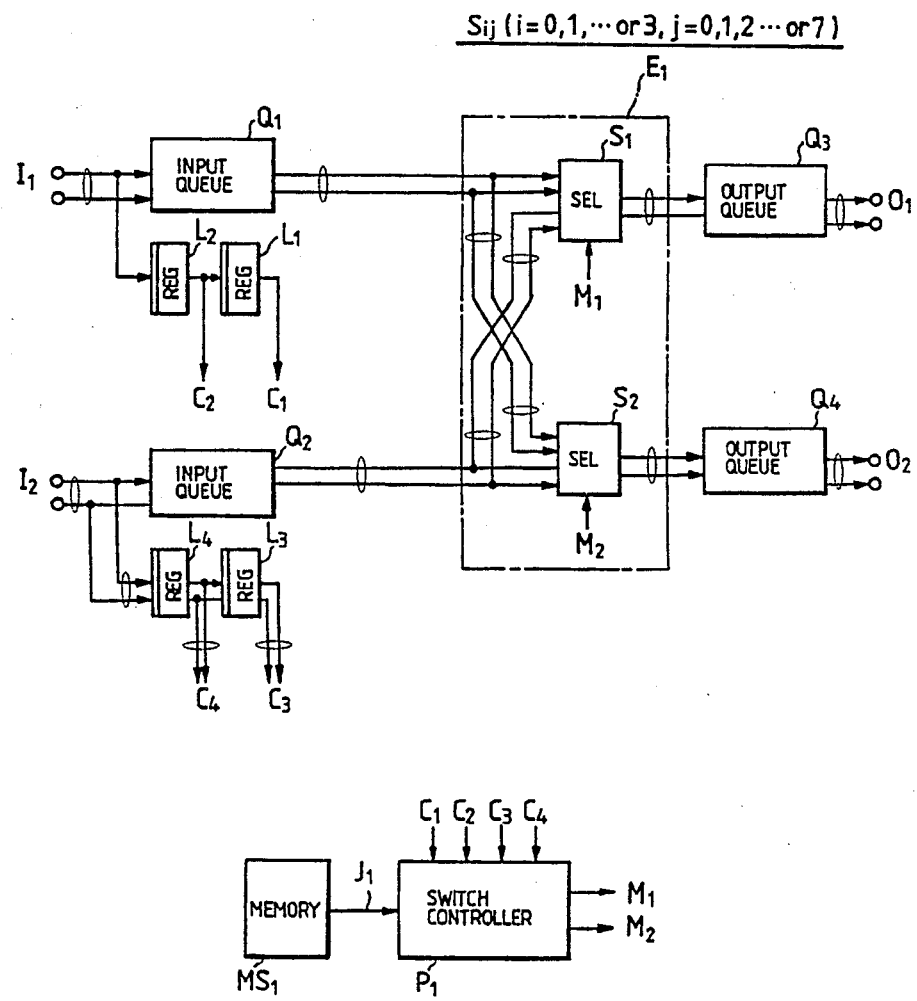
FIG. 3 is a block diagram of a switch (Sij) in the network of FIG. 2.

FIG. 2 shows a data transfer network (hereinafter also referred to simply as a network) composed of multi-staged switches. This system is assumed to be operated with 16 inputs/16 outputs. In FIG. 2, designated at S00-S37 are switches each having 2 inputs/2 outputs which constitute the network, the numeral in [ ] above a respective switch indicating its number. Designated at 0'-15' are input ports of the network and at 0"-15" are output ports of the network. The output ports 0"-15" have their respective addresses in binary notation of (0000)-(1111). FIG. 3 shows an example of the configuration of one among the multi-staged switches for use in the network of FIG. 2 for transferring the target address in a divided manner. In FIG. 3, designated at I1, I2, I2 are input ports of the switch, at O1, O2 output ports, at E1 an output port selector circuit, at Q1, Q2 input queues, at Q3, Q4 output ques, at L1, L2, L3, L4 registers for storing partial addresses included in respective subpackets, at S1, S2 selectors, at MS1 a memory in which information and procedures necessary for operation of the switch are stored, and at P1 a switch controller for controlling operation of the switch.

Figure 1A:
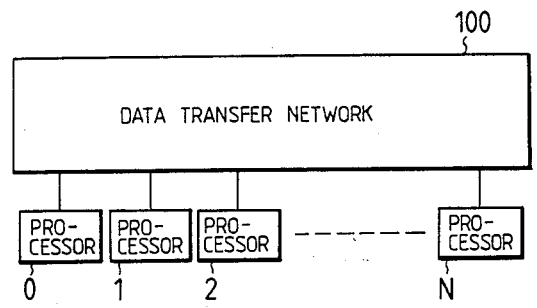
FIG. 1A is a block diagram showing a parallel computer system for which a data transfer network according to the present invention is used.
Figure 1B:
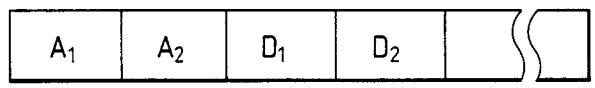
FIG. 1B is an illustration showing the structure of a packet used in the present invention.

For the sake of simplicity, it is here assumed that the packet applied to the network comprises the target address of 4 bits and data of 4 bits, while the data transfer path has a bit width of 2 bits, and that the target address is divided into two partial addresses A1, A2 and the data is divided into two partial data D1, D2, as shown in FIG. 1B. Also, supposing that the packet is to be transferred from the input port 1' to the output port 11" as indicated by thick lines. Since the output port 11" has its address (1011), A1 and A2 represent trains of bits 10 and 11, respectively. Operation of the data transfer network represented by FIGS. 2 and 3 under such conditions will now be described with reference to FIG. 4. As shown in FIG. 4, it is assumed that the partial addresses A1, A2 and the partial data D1, D2 are sequentially applied to the input port I2 of the switch S00 at the coordinate [00] in FIG. 2. At this time, the switch S00 stores the first and second partial addresses A1, A2 in the registers L3, L4, respectively, while the partial addresses A1, A2 and the partial data D1, D2 are sequentially loaded into the input queue. Outputs C3, C4 of the registers L3, L4 (corresponding now to the partial addresses A1, A2) are given to the switch controller P1. When the partial addresses A1, A2 are respectively set in the registers L3, L4, the switch controller P1 prepares and delivers control information M1, M2 for the selectors S1, S2 within the output port selector circuit E1 in response to both the content of the memory MS1 in the switch and the outputs C3, C4 of the registers L3, L4. More specifically, the information J1 about position of a judge bit that the first bit of first subpacket as indicated by * in FIG. 4 is a judge bit, is given from the memory MS1 to the switch controller P1, whereupon it takes out the judge bit out of the address of 4 bits comprising the output C3 (=A1) and the output C4 (=A2). In this case, since the value of the judge bit is equal to 1, the control information M2 is given to the selector S2 within the selector circuit E1 so as to create a path leading from the input port I2 to the output port O2. Thus, the foregoing subpackets are sequentially transmitted through the output queue Q4 from the output port O2 to the switch S14 belonging to the next stage. Further, the switch controller P1 can perform the similar processing for another packet applied through the input port I1 in parallel. Note that if destinations of two packets applied through the input ports I1, I2 conflict with each other, either one packet will first be preferentially processed.

In FIG. 2, since the output port O2 is selected within the switch S00, the foregoing packet is sent to the input port I1 of the switch S14. In the switch S14, as shown in FIG. 4, the information J1 about position of a judge bit that the second bit of first subpacket is a judge bit, is given from the memory MS1 in the switch S14 to the switch controller P1, whereupon it takes out the judge bit (0 in this case). In response to this, the control information is applied to the selector S1 within the selector circuit E1 so as to create the path leading from the input port I1 of the switch S14 to the output port O1 thereof, whereby the packet is sent to the switch S24. Thereafter, with the similar processing effected on the switch S24 where the judge bit is the first bit of second subpacket (1 in this case) and on the switch S35 where the judge bit is the second bit of second subpacket (1 in this case), the packet is now transferred to the output port 11" in the network.

FIG. 5 shows a timing chart of the above-mentioned operation. It is assumed in FIG. 5 that the respective subpackets are sequentially applied to the input port one after another for each period of time T. It is also assumed that the delay time attendant on passing through the wiring between every adjacent switches is sufficiently short, and the switch controller P1, the selectors S1, S2, etc. within each switch are operated with a sufficiently high speed. As will be seen from FIG. 5, each switch in the data transfer network represented by FIGS. 2 and 3 starts its switching operation after waiting for arrival of the two partial addresses. Therefore, the period of time $2T \times 4 = 8T$ during which every four switches are waiting for arrival of the two partial addresses, is required in addition to the period of time 4T for transfer of all the four subpackets, so that the total transfer time through the network is given by 12T.

Figure 6:
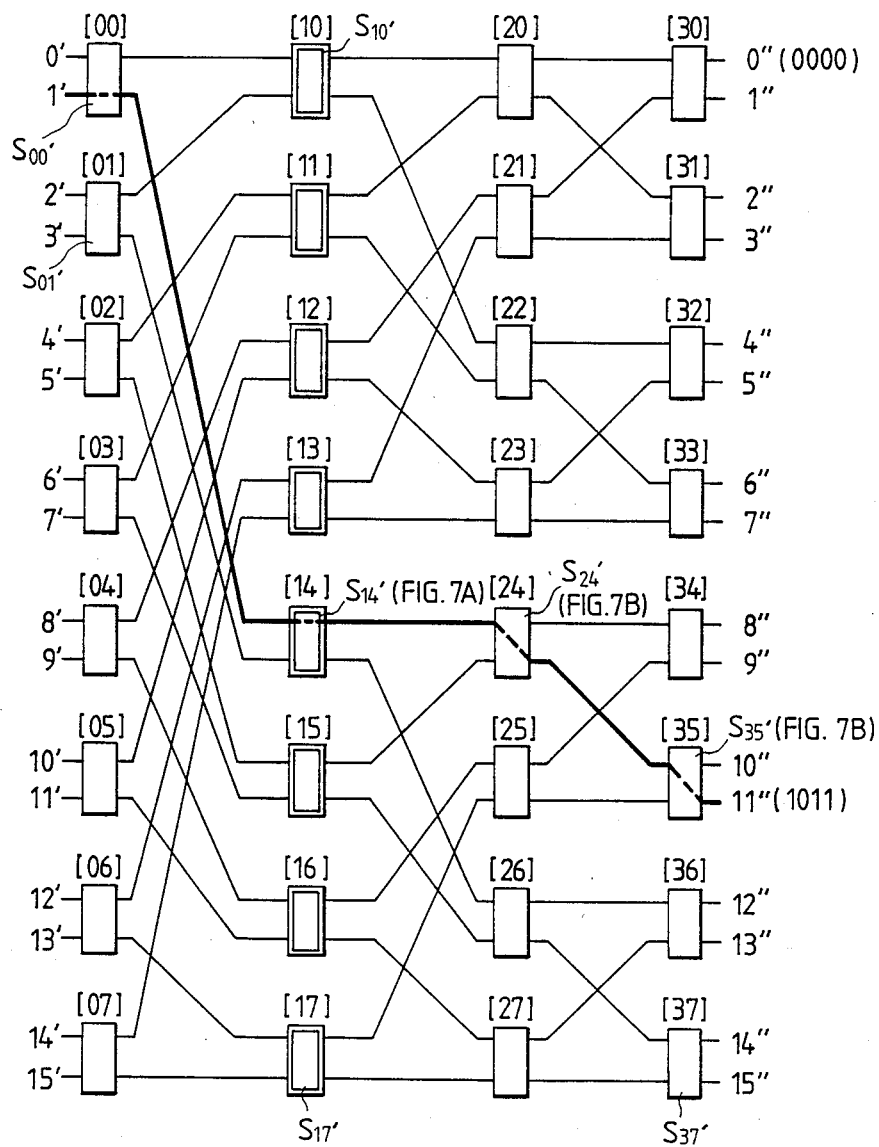
FIG. 6 is a block diagram of the data transfer network according to the present invention.

Preferred embodiments of the present invention will be described below. FIG. 6 shows a data transfer network composed of multi-staged switches, according to the present invention. This network is different from that of FIG. 2 in that each of the switches S00'-S37' starts its switching operation immediately after arrival of the first subpacket, without the need of waiting for arrival of all the subpackets each including the target address, to determine the succeeding switch to which the packet is to be delivered, and then send the packet to the output port thereof connected to that succeeding switch, and that those switches S10'- S17' belonging to the second stage are designed to exchange the partial addresses between the first subpacket and the second subpacket among the plurality of subpackets each having the partial target address. In the example of the network described in connection with FIGS. 2 and 3, while the partial address necessary for each of the switches S00-S07 belonging to the first stage and the switches S10-S17 belonging to the second stage to determine the succeeding switch to which the packet is to be delivered, is given by the first partial address A1 in the first subpacket of the packet applied thereto, that partial address is given by the second partial address A2 in the second subpacket for each of the switches S20-S37 belonging to the third and fourth stages. On the contrary, according to the present invention shown in FIG. 6, when a train of subpackets applied to any one of the switches S10'-S17' belonging to the second stage is output therefrom, the partial addresses A1, A2 are exchanged by the switches S10'-S17' belonging to the second stage, so that the second and first partial addresses A2, A1 are now included in the first and second subpackets, respectively, i.e., so that the partial address necessary for the succeeding switch to make its switching operation is always included in the first subpacket.

FIG. 7A shows one example of the configuration of each of the switches S10'-S17' belonging to the second stage. This configuration is different from that shown in FIG. 3 in that the former further includes selectors S3, S5 for respectively selecting either one of outputs C1, C2 and C3, C4 of registers L1, L2 and L3, L4 to select one of the partial addresses applied to the input port I1, I2 or stored in the registers L1, L2 or L3, L4, which is to be first delivered therefrom, and selectors S4, S6 for selecting a train of partial addresses output from the selectors S3, S5 to be applied to the output port selector circuit E1 prior to the partial data stored in the input queues Q1, Q2, respectively, that a switch controller P2 starts its operation in response to a packet start signal PSTR1 or PSTR2 applied thereto in synchronism with arrival of the first subpacket in the packet to the input port I1 or I2 and in parallel with the packet, and then completes its operation in response to a packet end signal PEND1 or PEND2 applied thereto in synchronism with arrival of the tail end of the packet to the input port I1 or I2, and that the information J2 about position of a judge bit applied thereto from a memory MS2 always indicates either one bit of the partial address in the first subpacket as a judge bit.

Further, as shown in FIG. 7B, each of the switches S00'-S07' belonging to the first stage and the switches S20'-S37' belonging to the third and fourth stages is identical to the switch as shown in FIG. 7A, excepting for the registers L1, L3 for storing the subpackets and the selectors S3-S6. In other words, these switches are different from the switches S10'-S17' belonging to the second stage in that the partial addresses are not exchanged between the subpackets, but similar to those switches S10'-S17' in that they are responsive to the packet start signal PSTR1, PSTR2 and the packet end signal PEND1, PEND2.

Similarly to the case of FIG. 2, for description of operation of the network in FIG. 6, it is assumed that the data transfer path has a bit width of 2 bits, and the target address comprises two partial addresses A1, A2 and the data comprises two partial data D1, D2, each of which is included in a subpacket of 2-bit length. Also, supposing that those subpackets are to be transferred from the input port 1' to the output port 11' as indicated by thick lines in FIG. 6. Operation of the data transfer network shown in FIG. 6 under such conditions will now be described with reference to FIG. 8. Similarly to the network represented by FIGS. 2 to 4, it is further assumed as shown in FIG. 8 that the partial addresses A1, A2 and the partial data D1, D2 are sequentially applied to the input port I2 of the switch S00' at the coordinate [00] in FIG. 6. The switches S00', S24', S35' in the network of FIG. 6 are operated substantially in the same manner as the switches S00, S24, S35 in the network of FIG. 2, except for the difference therebetween in that the former switches start their operations immediately upon arrival of the first partial address. More specifically, in the network of FIG. 6, the position of a judge bit for determining the succeeding switch to which the packet is to be sent from each preceding switch, is always in the partial address of the first subpacket as indicated by * in FIG. 8. Thus, the target output port of the packet is determined and the delivery operation is then started without waiting for arrival of the second subpacket.

One example of operation of the switch S14' in FIG. 6 will be described with reference to a timing chart of FIG. 9A. The partial addresses A1, A2 and the partial data D1, D2 are sequentially sent from the switch S00' to the switch S14'. At this time, the packet start signal PSRT1 is applied to the switch controller P2 in synchronism with arrival of the first partial address and in parallel with transfer of the packet, whereupon the switch controller P2 starts its control operation such that the switch S14' is operated as follows. In the switch S14', the first partial address A1 is stored in the register L2 at the first timing, and then the first partial address A1 is shifted to the register L1 and the second partial address A2 is stored in the register L2 at the second timing. At the third and fourth timings, the partial data D1, D2 are sequentially loaded into the input que Q1. Simultaneously, the content C2 of the register L2 is applied to the switch controller P2. In this case, as soon as the first partial address A1 reaches the register L2, it is also applied to C2 to the switch controller P2. The switch controller P2 responds to a bit at the position in the output C2 indicated by the information J2 about position of a judge bit given from the memory MS2, for preparing and applying the control information M1, M2 to the selectors S1, S2 within the output port selector circuit E1, so that the path leading from the input port I1 to the output port O1 is created. Further, the switch controller P2 applies a control signal M3 to the selector S3 so that out of the first partial address A1 stored in the register L1 and the second partial address A2 stored in the register L2, the selector S3 selects A2 at the third timing and A1 at the fourth timing, thereby exchanging the partial addresses A1 and A2 in their sequence. Moreover, the switch controller P2 applies a control signal M4 to the selector S4 so that the selector S4 selects the partial address A2 output from the selector S3 at the third timing and the partial address A1 output from the selector S3 at the fourth timing, and also selects the partial data D1, D2 loaded in the input queue Q1 at the fifth and sixth timings, respectively, for applying them to the output port selector circuit E1. The outputs of the selector circuit E1 are applied to the output queue Q3 such that A2, A1, D1 and D2 are input to and stored in the output queue Q3 at the third, fourth, fifth and sixth timings, respectively. By so doing, the target address prepared by exchanging the partial addresses A1 and A2 as mentioned above can selectively be applied to the output port selector circuit E1 prior to the data loaded in the input queue Q1.

As will been seen from FIG. 9A which shows a timing chart of operation of the network of FIG. 6, the period of time required for the respective switches S00', S24', S25' to await arrival of the target address is shortened to the period of time T which is equal to a half that required in the case of FIG. 2. Therefore, it will be resulted in that the total transfer time through the network is given by 9T and hence the transfer speed is improved by 25% as compared with 12T in the network of FIG. 2 (corresponding to the timing chart of FIG. 5).

In addition, the switch controller P2 can also perform the similar processing on the packet applied through the input port I2, and has a function to determine the priority between the input data applied through the input ports 11 and 12 in a like manner to the case of FIG. 3. Respective output enable signals OE1, OE2 for the output ports O1, O2 are applied to the switch controller P2. When the signal OE1 is turned to indicate an output enable state, an output control signal OC1 is applied from the switch controller P2 to the output queue Q3, so that the partial addresses A2, A1 and the partial data D1, D2 are sequentially delivered to the output port O1 from the output queue Q3. Likewise, when the signal OE2 is turned to indicate an output enable state, an output control signal OC2 is applied from the switch controller P2 to the output queue Q4. If the output queue Q3 or Q4 becomes full of data and can no longer store any new data, a status signal SQ1 or SQ2 is applied to the switch controller P2. Although the switch controller P2 normally outputs input enable signals IA1, IA2 to the input terminals I1, I2, respectively, these input enable signals IA1, IA2 are turned to an input disable state in response to the respective status signal SQ1, SQ2 to thereby inhibit input of any more new data. In case of the configuration of FIG. 6, by applying the input enable signal IA1 (or IA2) for the succeeding switch to the preceding switch as the output enable signal OE1 (or OE2) thereof, it becomes possible to prevent the packet from being missed due to the overflow of the any queues midway the transmission route. In FIG. 7A, the timings of setting data into the registers L1, L2 and the output queues Q1, Q3 are controlled by signals T11, T12, T13, T14, and the timings of setting data into the registers L3, L4 and the output queues Q2, Q4 are controlled by signals T21, T22, T23, T24, respectively, these signals being applied from the switch controller.

Figure 10:
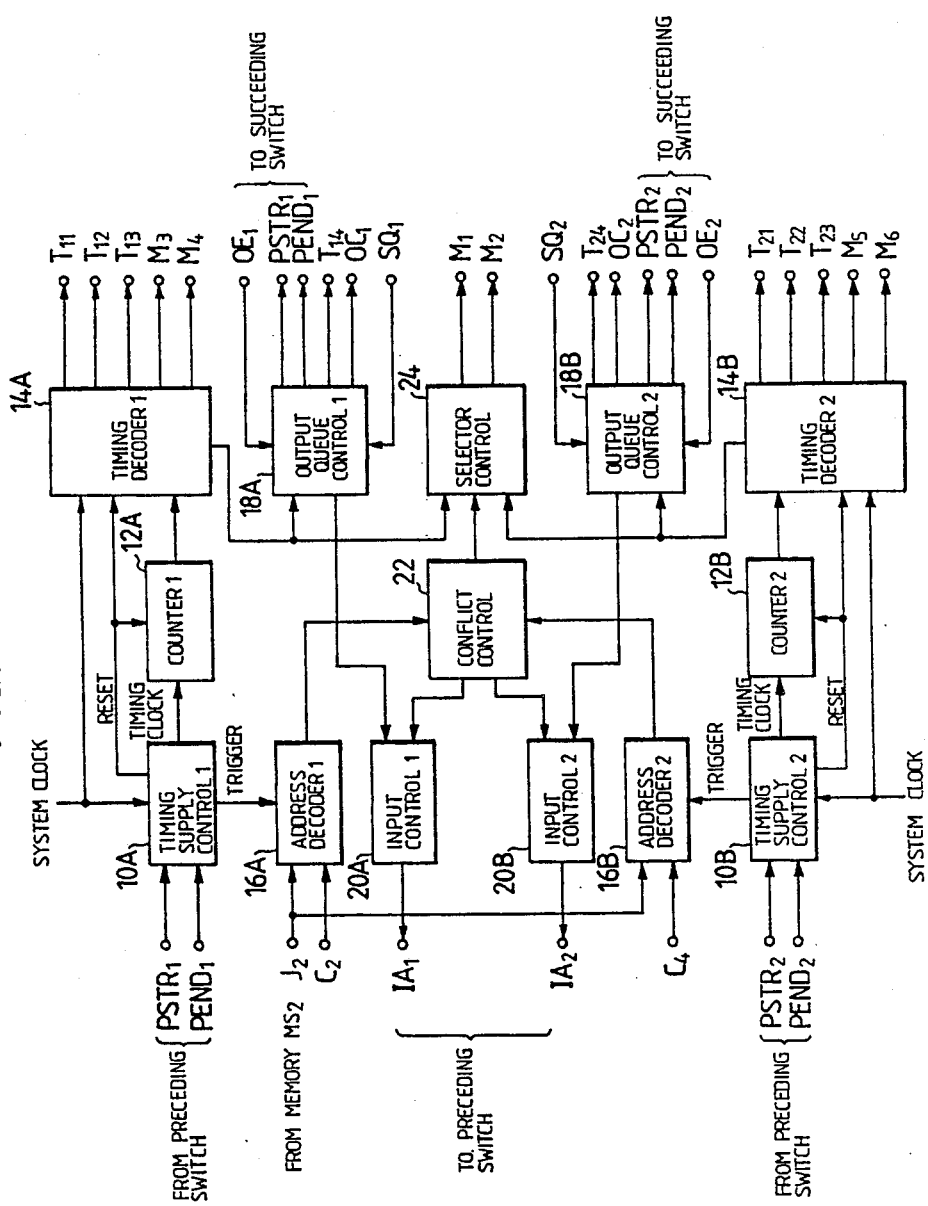
FIG. 10 is a block diagram of a switch controller (P2) for use in the switch of FIG. 7A.

FIG. 10 is a block diagram of the switch controller P2 in FIG. 7A. In FIG. 10, a timing supply control 10A or 10B actuates an address decoder 16A or 16B in response to the packet start signal PSTR1 or PSTR2 and also applies timing clocks to a counter 12A or 12B, and then resets the counter 12A or 12B and timing decoder 14A or 14B in response to the packet end signal PEND1 applied in synchronous timing with arrival of the tail end of the packet to the input port I1 or I2 (FIG. 7A). The address decoder 16A or 16B takes out the bit from the output C2 or C4 of the register L2 or L4 in response to the information J2 about position of a judge bit given by the memory MS2, for delivering it to a conflict control 22 as an signal indicative of whether the input packet should be sent to the output $\overline{O1}$ or $\overline{O2}$. The timing decoder 14A or 14B responds to a counted value of the counter 12A, 12B for delivering any of control signals T11-T14, M3, M4 or T21-T23, M5, M6, and also actuates both an output queue control 18A or 18B and a selector control 24.

The conflict control 22 checks if there exists any conflict between the outputs of the address decoders 16A and 16B. If no, the conflict control 22 sends a signal to a selector control 24, whereupon it generates selector control signals M1, M2. If there occurs any conflict therebetween, the conflict control 22 responds to only either one of the two outputs and sends it to the selector control 24. At the same time, a signal is sent to an input control 20A or 20B corresponding to the other one of the address decoders 16A and 16B. The input control 20A or 20B produces the signal IA1 or IA2 for inhibiting transmission of any more new data and sends it to the associated preceding switch.

The output queue control 18A or 18B produces signals T14, $\overline{OC11}$ or T24, $\overline{OC2}$ for controlling the output que Q3 or Q4, and also produces the packet start signal PSTR1 or PSTR2 and the packet end signal PEND1 or PEND2 in synchronism with transmission start or end of the packet for sending those signals to the associated succeeding switches, respectively.

FIG. 9B shows a timing chart for the case where the timing control different from that of FIG. 9A is carried out using the network represented by FIGS. 6, 7A and 7B. In this case, similarly to that of FIG. 9A, the partial addresses A1, A2 and the partial data D1, D2 are sequentially sent to the input port I1 of the switch S14' in the network of FIG. 6 from the switch S00'. At the first timing, the switch S14' stores the first partial address A1 into the register L2 and determines the output port to which the data is delivered therefrom. At the next second timing, the first partial address A1 is shifted to the register L1 and the second partial address A2 is sent to the output queue Q3 passing through the register L2. In the embodiment of operation shown in FIG. 9A, the partial address A1 required to be processed (interpreted) for determining the target output port of the packet is included in the first subpacket, and the partial address A2 included in the second subpacket requires no processing (interpretation) in the switch S14'. Therefore, the second partial address A2 can be passed through the register at the second timing as mentioned above. In these steps, the switch controller P2 and the selectors S1, S2, S3, S4 can be controlled in a like manner to the case of FIG. 9A. At the succeeding third and fourth timings, the partial data D1, D2 are sequentially loaded into the input queue Q1, while A1, D1 and D2 are sent to the output queue Q3 at the third, fourth and fifth timings, respectively. Thus, the operation of FIG. 9B can eliminate the waiting time of T1 which was required by the switch S14' in the operation of FIG. 9A. Stated otherwise, according to the embodiment of FIG.

9B, the total transfer time is reduced from 9T in the case of FIG. 9A to 8T, so that the pipelined operation can be implemented with no waiting time.

In the foregoing, the partial addresses A2, A1 and the partial data D1, D2 have been described as being once stored in the output que Q3 sequentially. But, it will be apparent that when the output enable signal OE1 indicates an output enable state from the beginning, those subpackets may directly be sent to the output port O1 at the third, fourth, fifth and sixth timings by passing through or bypassing the output queue Q3. It will also be apparent that the output queues Q3, Q4 for storing therein a train of the partial addresses and the partial data may be disposed not before the output ports, but after the input ports, or they may be disposed in both locations. Furthermore, the input ques Q1, Q2 and the output queues Q3, Q4 may be formed by RAM's or register files as well as FIFO memories. Although the registers L3, L4 and the registers L1, L2 are serially connected in FIG. 7A, it may be arranged that the first and second subpackets are loaded into the register L1 (or L3) and L2 (or L4) through selectors, respectively. In this case, the registers L1 to L4 may be each formed using a part of a RAM or register file (with sufficient length of data words).

As will be seen from the foregoing description, the effect of the present invention is enhanced with larger scale of the network and increasing stage numbers of switches. Although it was assumed in the above description that the data transfer path had a data width of 2 bits, the target address had 4 bits, and the data had 4 bits, it will be apparent that the present invention is effective for any desired setting values so long as the number of bits of the target address is larger than the data width of the data transfer path. Further, although the switches have been described as each having two inputs/two outputs, it will also be apparent that the present invention is effective independent of particular configurations of the switches and networks.

Figure 11A:
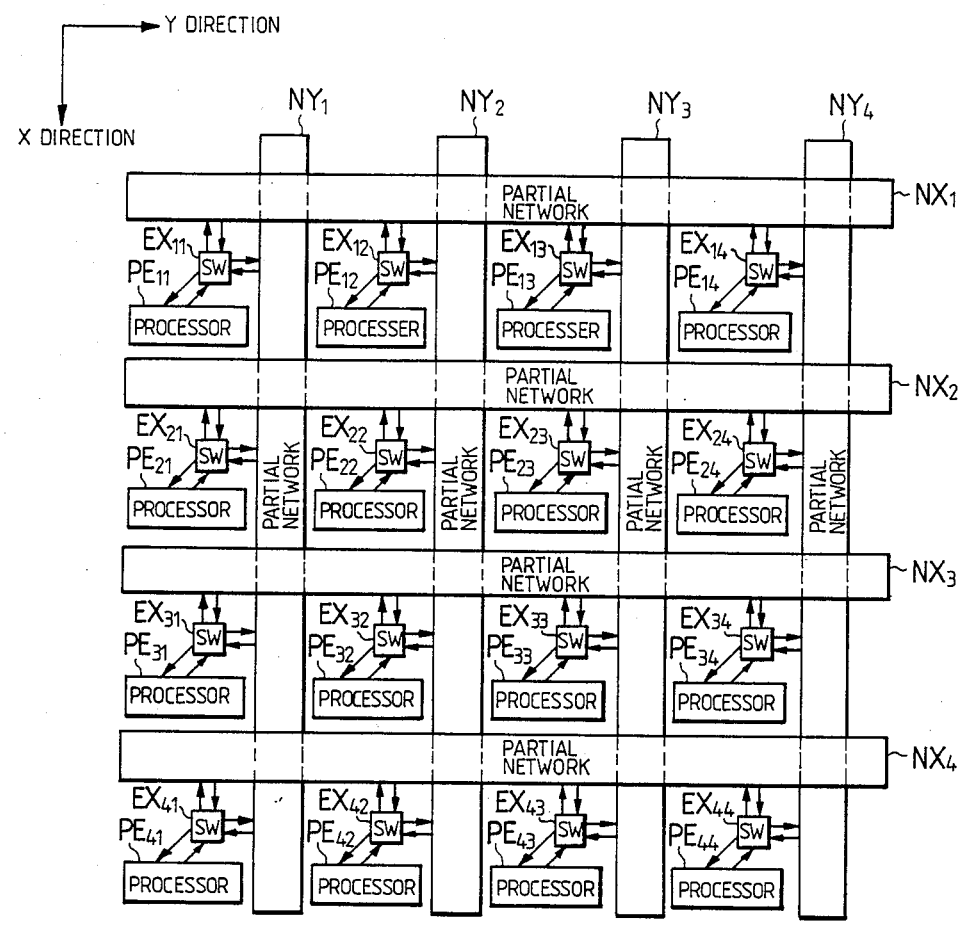
FIGS. 11A and 11B shows another embodiment of the data transfer network according to the present invention in which partial networks are used.

FIG. 11A shows another embodiment of the present invention. Designated at PE11-PE44 are processors which are interconnected by a data transfer network comprising switches EX11-EX44, X partial networks NX1-NX4, and Y partial networks NY1-NY4. In this data transfer network, the packet to be transferred is the same as that shown in FIG. 1B. However, the target partial addresses A1, A2 are determined corresponding to an X-direction subscript i and a Y-direction subscript j of each processor PEij. In other words, the address of processor PEij is represented by a set of X address i and Y address j.

Figure 11B:
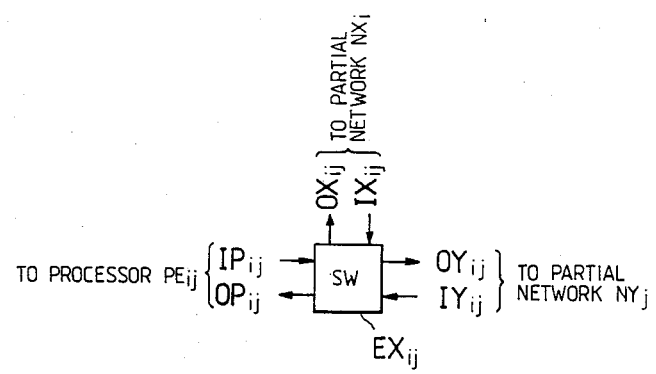

In FIG. 11A, those processors PEij (j=1 to 4, i=1, 2, 3 or 4) having the same i and those processors PEij (i=1 to 4, j=1, 2, 3 or 4) having the same j belong to a respective one cluster. The X partial network NXi (i=1, 2, 3 or 4) interconnects the processors PEij (j=1 to 4) which belong to the cluster commonly having the same i (referred to as X cluster), while the Y partial network NYj (j=1, 2, 3 or 4) interconnects the processors PEij (i=1 to 4) which belong to the cluster commonly having the same j (referred to as Y cluster). These partial networks NXi, NXj are each of a network composed of mutli-staged switches as shown in FIG. 6. As will be described later on, each of the multi-staged switches for use in the partial network do not require an exchange the partial addresses, and hence can be constituted using the same switch as shown in FIG. 7B. The switch EXij (i=1, 2, 3 or 4, j=1, 2, 3 or 4) is a switch with 3 input ports/3 output ports adapted to interconnect the X partial network NXi, the Y partial network NYj, and the processor PEij. For example, the processors PE11, PE12, PE13, PE14 are connected to the X partial network NX1 through the switches EX11, EX12, EX13, EX14, respectively, and the processors PE11, PE21, PE31, PE41 are connected to the Y partial network NY1 through the switches LEX11, EX21, EX31, EX41, respectively. As shown in FIG. 11B, each switch PEij has an input port IPij and an output port OPij for connection with the processor PEij, an input port IXij and an output port OXij for connection with the X partial network NXi, and an input port IYij and an output port OYij for connection with the Y partial network NYj.

Note that because of the need of exchanging the partial addresses A1 and A2 as mentioned later on, the switch EXij is configured as shown in FIG. 12, for example, by modifying the switch of FIG. 12 to be adapted for 3 input ports/3 output ports. Respective parts and signals in FIG. 12 are similar to those parts and signals in FIG. 7A which have symbols beginning with the same English character or a train of English characters.

In this embodiment, the data transfer between the processors PEij and PEkl ($1 \leq i, j, k, l \leq 4$) may be carried out through a path of PEij→EXij→NXi→EXil→NY1→EXkl and PEkl, or through another path of PEij→EXij→NYj→EXkj→NXk→EXkl and PEkl.

Operation of the network of FIG. 11A will now be described with reference to FIGS. 13A to 13C. Assuming here that the packet to be sent from a given processor PEij to another processor PEkl is received by the switch EXij via the input port IPij thereof (step 130). In this case, the first and second partial addresses A1, A2 at the head of the packet are equal to the X address k and the Y address l of the target process PEkl, respectively.

Figure 13A:
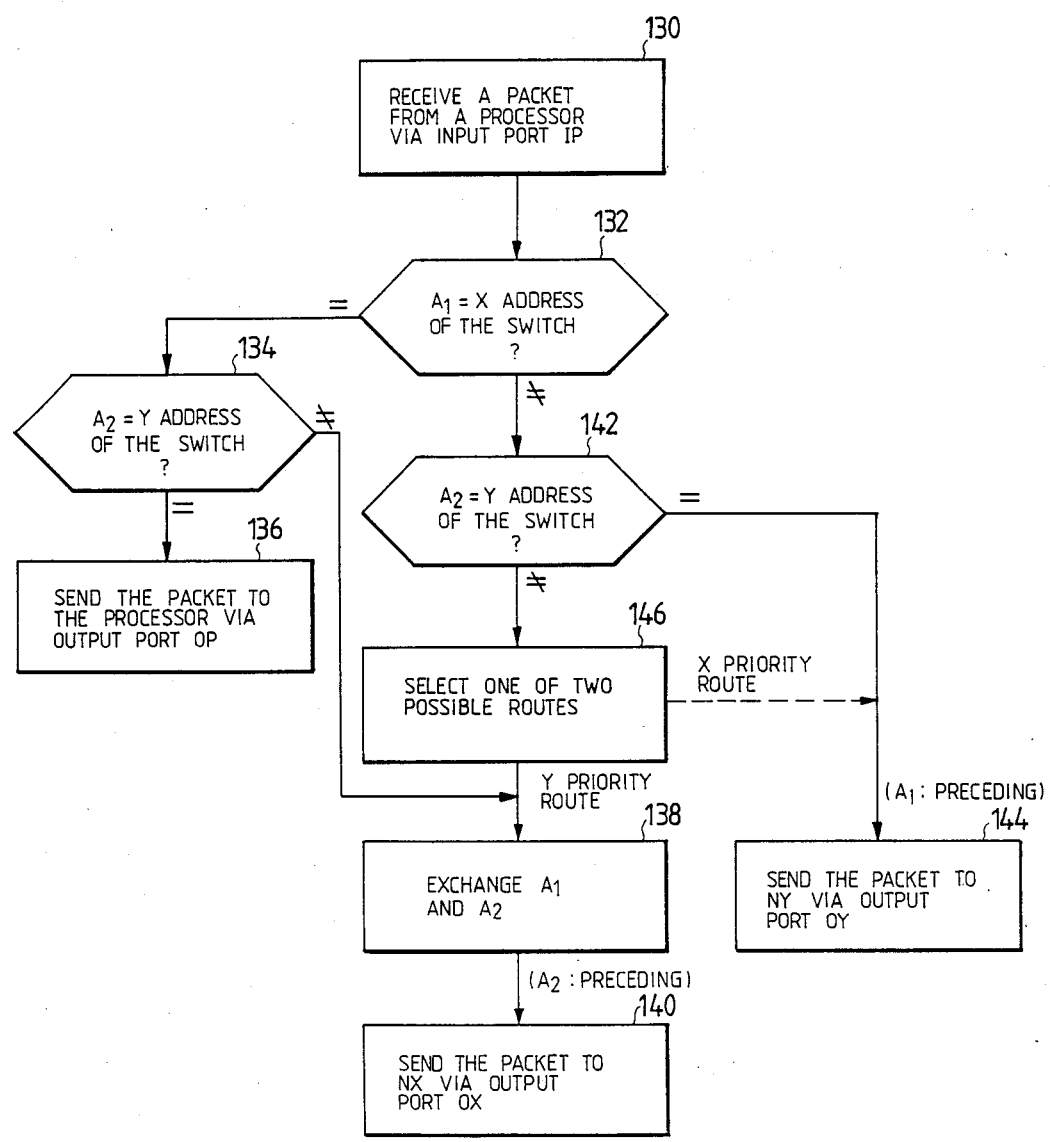
FIG. 13A is a flow chart showing operation of the switch (EXij) for use in the network of FIG. 12 at the time it receives a packet from a processor.

(1) As shown in FIG. 13A, the switch EXij determines as to whether or not the packet meets the first condition of A1 (=k)=its own X address (i) (step 132). If met, (i.e., if the target processor PEkl and the source processor PEij belong to the same X cluster), then it determines as to whether the packet meets the second condition of A2=its own Y address (j) (step 134). If met, (i.e., if the target processor PEkl is the same as the source processor PEij), then the switch EXij sends the packet to the processor PEij via the output port $\overline{OP}ij$ thereof (step 136). On the other hand, if the second condition is not met as the result of determining the second condition in step 134, (i.e., if the target processor PEkl is another processor belonging to the same X cluster as the source processor PEij), then the partial addresses A1 and A2 are exchanged (step 138) and the packet is sent to the X partial network NXi via the output port $\overline{OX}ij$ (step 140). With this address exchange, the Y address l of the target processor PEkl is now positioned at the head of the packet. As a result, the switches belonging to the X partial network NXi (=NXk) can start their switching operations in response to the partial address A2 at the head of the packet immediately upon arrival of the first subpacket of the packet. The X partial network NXk sends the packet to the switch EXkl via the input port IXkl thereof. As shown in FIG. 13B, upon receiving the packet (step 162), the switch EXkl determines as to whether or not the partial address (A2 (=l)) in this case) in the first subpacket of the packet is equal to the Y address l of the switch EXkl (=EXil) (step 164).

Since that condition is met in this case, the switch EXkl sends the packet to the processor PEkl via the output port $\overline{OP}kl$ thereof (step 166). In this manner, the packet is transferred between two processors belonging to the same X cluster.

(2) As the result of determining the first condition in step 132 of FIG. 13A, if the first condition is found not met, (i.e., if the source processor PEKl and the target processor PEij do not belong to the same X cluster), then the switch EXij determines as to whether or not the packet meets the second condition of A2 (=1)=its own Y address (j) (step 142). If the second condition is met as the result of that determination, i.e., if both the processors PEkl and PEij belong to not the same X cluster but the same Y cluster, then the switch EXij sends the packet to the Y partial network NYj via the output port $\overline{OY}ij$ thereof (step 144). The Y partial network NYj sends the packet to the switch EXkj whose X address is equal to the partial address A1 (=k) at the head of the packet. As shown in FIG. 13C, upon receiving the packet via the input port IYkj (step 152), the switch EXkj determines as to whether or not the second partial address A2 of the packet is equal to its own Y address (j) (step 154). Since that condition is met in this case, the switch EXkj sends the packet to the associated processor PEkj via the output port $\overline{OP}kj$ thereof (step 156). In this manner, the packet can be transferred between two processors belonging to the same Y cluster.

(3) If the result of determination in step 142 of FIG. 13A is negative, i.e., if the target processor PEkl and the source processor PEij belong neither the same X cluster nor the same Y cluster, there are two possible routes connecting between those two processors. More specifically, the first route is a route with which the packet is first transferred in the direction of X partial network. Stated in more detail, the first route is represented by PEij→EXij→NXi→Exil→NYl →Exkl→PEkl. This route is hereinafter referred to as a Y priority route because the Y address is first determined. The second route is a route with which the packet is first transferred in the direction of Y partial network. Stated in more detail, the second route is represented by PEij→EXij→NYj→EXkj→NXk→EXkl→PEkl. This route is hereinafter referred to as a X priority route because the X address is first determined. Step 146 selects either one of these two routes. Such selections of route may be decided for each switch EXij in advance. In this case, the step 146 can be dispensed with. As an alternative, the selection of route can be modified in a dynamic manner by measuring the amount (load) of packets passing through each of the partial networks in the network, and then distributing the load among the partial networks as even as possible.

If the X priority route is selected in step 146, then the switch EXij sends the packet to the Y partial network NYj via the output port $\overline{OY}ij$ thereof (step 144). Upon receiving the packet, the Y partial network NYj sends the packet to the switch EXkj via the input port IYkj thereof, whose X address is equal to the partial address A1 (=k) at the head of the packet. As shown in FIG. 13C, upon receiving the packet (step 152), the switch EXkj determines as to whether or not the second partial address A2 (=1) is equal to its own Y address (=j) (step 154). Since j≠1 is assumed in this case, the result of determination in step 154 is negative. Then, the switch EXkj exchanges the partial addresses A1 and A2 in the packet so that the partial address A2 is shifted to the head of the packet (step 158). Thereafter, the packet is sent to the X partial network NXk via the output port $\overline{OX}kj$ of the switch EXkj.

The respective switches in the X partial network NXk can respond to the partial address A2 at the head of the packet immediately upon arrival thereof. Then, the X partial network NXk sends the packet to the switch EXkl whose Y address is equal to the partial address A2 (=1).

Upon receiving the packet via the input port IXkl (step 162, FIG. 13B), the switch EXkl determines as to whether the partial address A1 in the packet is equal to its own X address (=k). Since the result of such determination is positive in this case, the switch EXkl sends the packet to the processor PEkl. In this manner, the packet can be transferred through the X priority route between two processors not belonging to the same cluster.

Further, if the Y priority route is selected in step 146 (FIG. 13A), then the switch EXij exchanges the partial addresses A1 and A2 in the packet so that A2 is shifted to the head (step 138). Thereafter, the packet is sent to the X partial network NXi (step 140). The partial network NXi sends the packet to the switch EXil whose Y address is equal to the partial address A2 (=1).

Figure 13B:
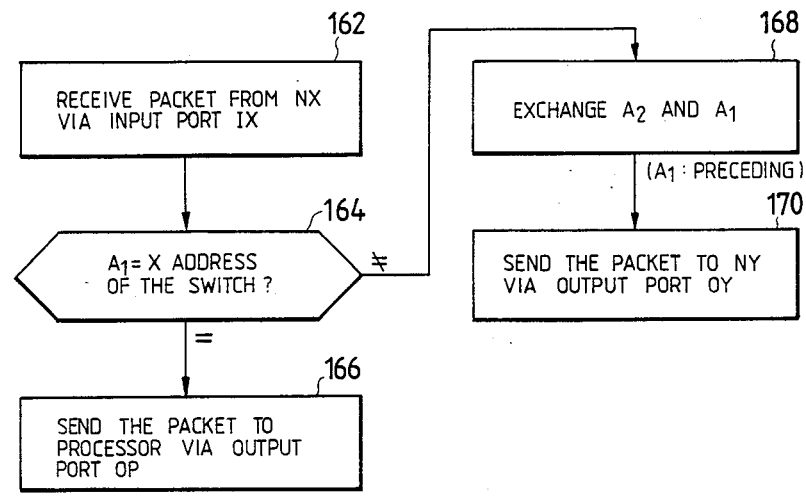
FIG. 13B is a flow chart showing operation of the switch (EXij) for use in the network of FIG. 12 at the time it receives a packet from a partial network NY.
Figure 13C:
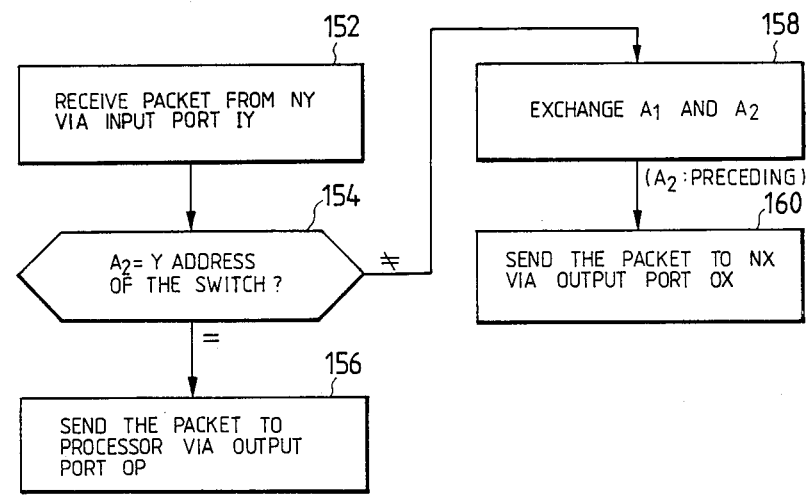
FIG. 13C is a flow chart showing operation of the switch (EXij) for use in the network of FIG. 12 at the time it receives a packet from a partial network XY.

As shown in FIG. 13B, upon receiving the packet (step 162), the switch EXil determines as to whether or not the partial address A1 (=k) is equal to its own X address (=i) (step 164). Since the result of such determination is negative in this case, the switch EXil exchanges the partial addresses A2 and A1 so that A1 is shifted to the head of the packet (step 168). Then, the packet is transferred to the Y partial network NY1 (step 170). The Y partial network NY1 sends the packet to the switch EXkl whose X address is equal to the first partial address A1 (=k) in the packet. Through steps 152, 154 and 156 in FIG. 13C, the switch EXkl delivers the packet to the associated processor PEkl. In this manner, the packet can be transferred along the Y priority route between two processors not belonging to the same cluster.

The network of this embodiment is advantageous in that the partial networks are each reduced in scale, and hence the whole network can be mounted easily. Since the processors are grouped into respective clusters, only the first partial address A1 of the target address is required for transfer along the Y partial networks NYj and only the second partial address A2 thereof is required for transfer along the X partial networks NXi. In this embodiment, each switch EXij includes means for exchanging A1 and A2 such that the partial address required for transfer along the partial network NXi or NYj is always located in the first subpacket. Therefore, the respective switches in the partial networks can transfer data with high speeds without waiting for all of the partial addresses.

The network of FIG. 11A can be operated at higher speeds by modifying it as follows.

More specifically, in FIG. 13B, the determination step 164 that is done at the time when each of switches EXmn (where m, n are integers) receives the packet from the X partial network NXm, requires to wait for arrival of the partial address A1 from the X partial network NXm before starting the determination step. As mentioned above, however, the packet transferred along the X partial network NXm has the partial address A1 at the head thereof. Thus, the determination step 164 can be started after waiting for arrival of the second subpacket from the X partial subpacket NXm to the switch EXmn. There occurs a similar problem also in the determintion step 154 of FIG. 13C. Such a problem can be improved by modifying the partial networks NXm, NYn, etc. as follows.

As shown in step 180A or 180B of FIG. 14A or 14B, the partial networks NXm or NYn, etc. are modified such that when the packet is output from a respective partial network to a given switch EXmn, another switch in the partial network nearest to the switch EXmn is operated to exchange the addresses A1 and A2 in the packet. Such modification can be implemented in a like manner to that in connection with FIG. 9B. As a result, when receiving the packet from the X partial network NXm, the switch EXmn is operated as shown in FIG. 14C. The same reference numerals in FIG. 14C as those in FIG. 13B represent the same process steps. As will be seen from FIG. 14C, although the switch EXmn carries out the determination step 164 for the partial address A1 similarly to the case of FIG. 13B, the determination step 164 can be started immediately upon arrival of the partial address A1 according to the improved configuration, because the partial address A1 is now included at the head of the packet sent from the X partial network NXm as a result of the above modification. Further, since the X partial network NXm exchanges the partial addresses at the time of outputting the packet to the switch EXmn, the address exchange which was required in FIG. 13B is no longer necessary in FIG. 14C.

Likewise, when receiving the packet from the Y partial network NYm, the switch EXmn is operated as shown in FIG. 14D. The same reference numerals in FIG. 14D as those in FIG. 12C represent the same process steps. The above-mentioned comparison between FIG. 14C and FIG. 13B directly applies to this case as well.

Although A1, A2 have each 2 bits and d has 2 bits too in the foregoing description, the effect of the present invention will remain unchanged even if they are set to have any desired other number of bits. It will also be apparent that the number of target addresses divided may be increased such as by dividing the target address into three partial addresses, providing Z partial networks in addition to the X and Y partial networks, and using switches EXijk each with 4 input ports/4 output ports in place of the switches EXij.

Figure 15:
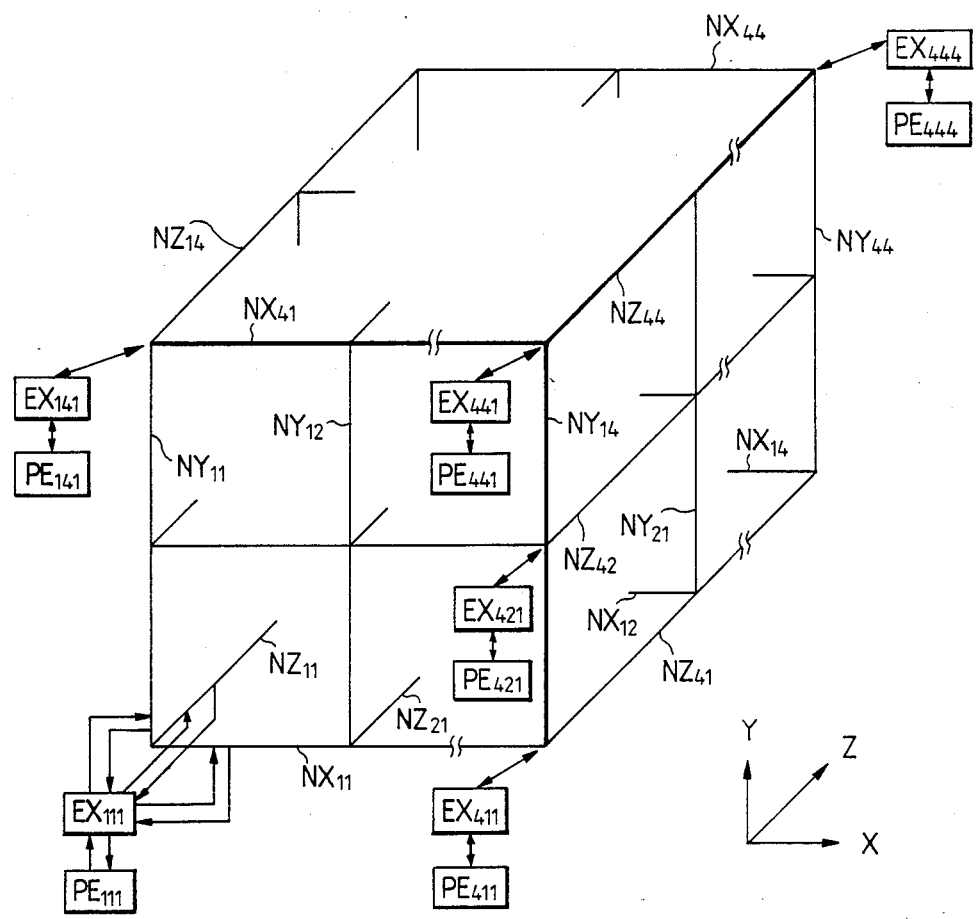
FIG. 15 shows an embodiment of the data transfer network according to the present invention in which three-dimensional partial networks are used.

FIG. 15 illustrates an embodiment of such a three-dimensional data transfer network according to the present invention. In FIG. 15, designated at NX11, NX12, NX14, NX44, etc. are X partial networks, and at NY11, NY12, NY14, NY44, etc. are Y partial networks, these partial networks being identical to those in FIG. 11A. In this embodiment, Z partial networks NZ11, NZ21, NZ41, NZ14, ..., NZ44, etc. are further provided.

At respective cross points of those three partial networks, there are provided switches EX111, EX141, EX411, EX444, etc. and processors PE111, PE141, PE411, PE444, etc. For the sake of simplicity, each partial network is indicated by a rectilinear line, and only a part of the switches and processors is shown in FIG. 15.

The switch EX111 has its input ports and output ports which are connected to the X partial network NX11, Y partial network NY11, Z partial network NZ11 and processor PE111. This equally applies to other switches. When the packet is transferred from a given processor to another processor, the target address in the packet is formed of three partial addresses A1, A2 and A3. Assuming the packet target processor to be Pijk, A1, A2 and A3 are equal to X, Y and Z coordinates i, j and k of that processor, respectively.

Supposing now that the packet is sent from the processor PE111 to PE444, there are several possible transfer routes of the packet. For example, one route is represented by PE111→EX111→NX11→EX411→NY14→EX411→NZ44→EX444→PE444. Operation of transferring the packet along this route is as follows. When sending the packet to the partial network NX11, the switch EX111 transfers the packet without exchanging the partial addresses A1, A2 and A3 similarly to the case of FIG. 13A. The partial network NX11 sends the packet to the switch EX411 whose X coordinate is equal to the partial address A1 in the packet. Since the Y coordinate of the switch EX411 is different from A2 among the partial addresses A1, A2 and A3 in the packet, the switch EX411 exchanges those three partial addresses in the packet to the order of A2, A3, A1 at the time of delivering the packet to the Y partial network NY14. This network NY14 sends the packet to the switch EX441 whose Y coordinate is equal to the partial address A2.

Since the Z coordinate of the switch EX441 is different from the partial addresses A3 in the packet, the switch EX411 exchanges the three partial addresses in the packet to the order of A3, A1, A2 at the time of delivering the packet to the Z partial network NZ44. This network NZ44 sends the packet to the switch EX444 whose Z coordinate is equal to the partial address A3. In this way, when there are a larger number of processors than the case of FIG. 11A, this embodiment permits to transfer data among them. Also, since each switch EX carries out exchange of three partial addresses as mentioned above, the respective switches in the following partial networks can start switching always in response to the partial network at the head of the packet arrived.

It is to be noted that when the partial networks, e.g., NX11, NY14, NZ44, are modified to exchange the partial addresses at the time of outputting the packet therefrom, rather than exchanging them in the switches, e.g., EX111, EX441, as shown in FIGS. 14C and 14D, the transfer operation can be further speeded up.

Figure 16B:
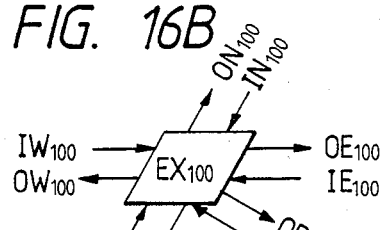
FIG. 16B is a view showing an input/output port of a switch (EX100) in FIG. 16.
Figure 16A:
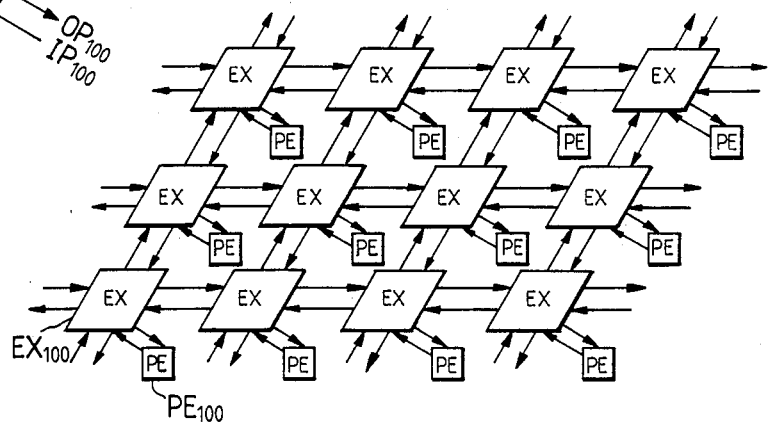
FIG. 16A shows another embodiment of the present invention using a network interconnected in the form of grid.
Figure 17:
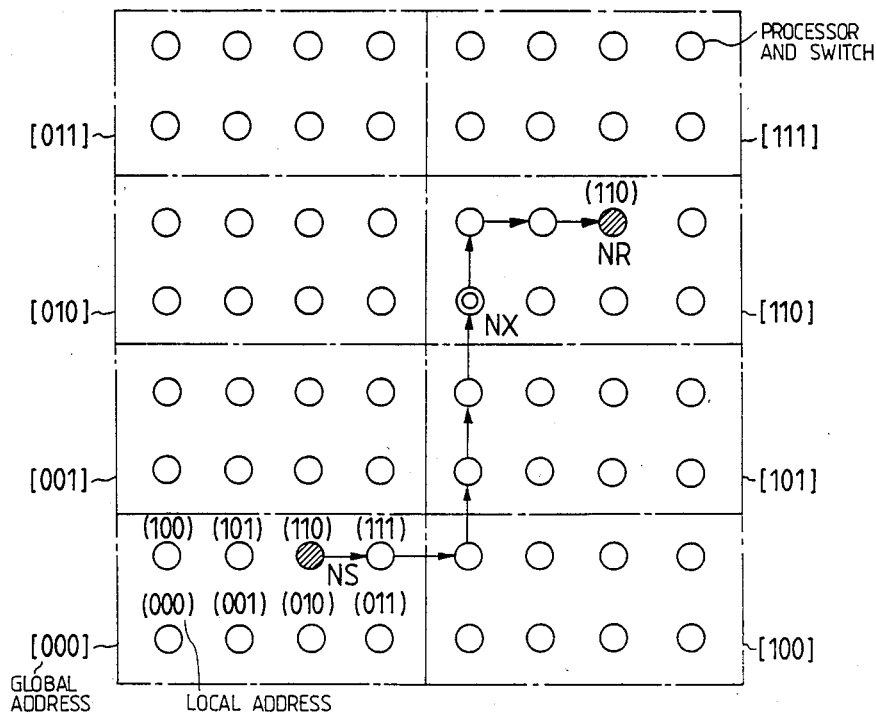
FIG. 17 is a view showing data transfer routes in the network of FIG. 16A.
Figure 18:
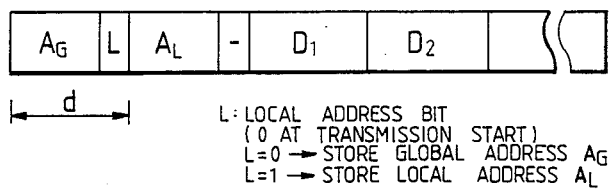
FIG. 18 is an illustration of a packet for use in the network of FIG. 16A.
Figure 19:
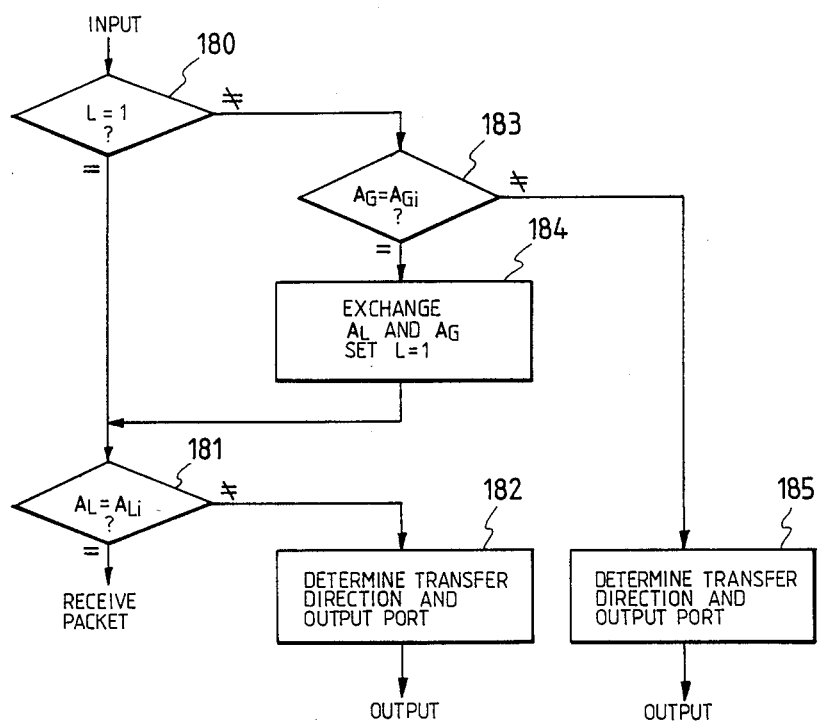
FIG. 19 is a flow chart showing operation of a switch (EX) in the network of FIG. 16A.
Figure 20:
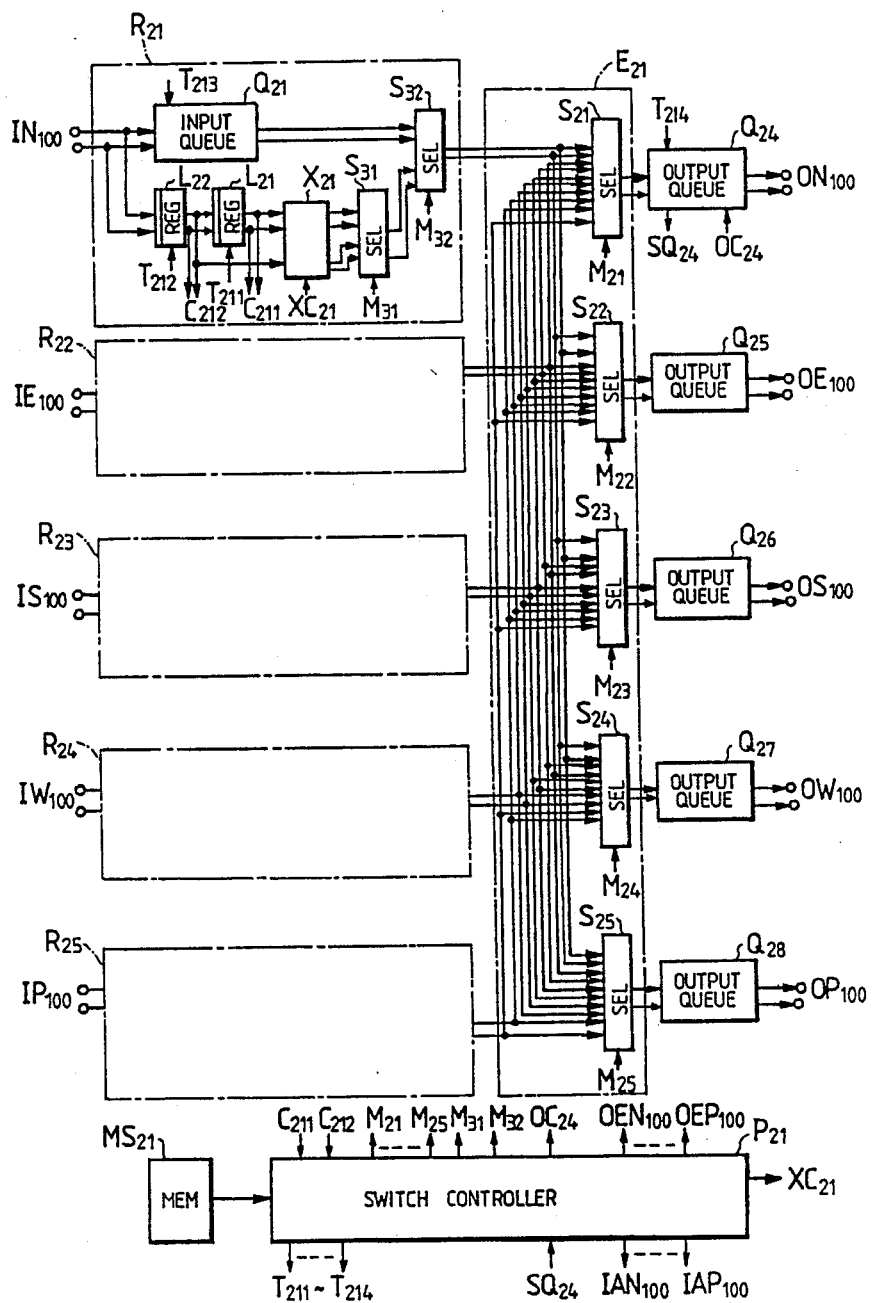
FIG. 20 is a block diagram of the switch (EX) in the network of FIG. 16A.

FIG. 16A shows another embodiment of the present invention. Designated at PE is a processor and at EX is a switch. As shown, a plurality of processors are each similar to the processor PE100 and provided with a single switch similar to the switch EX100. Each switch EX is connected to four surrounding switches via input ports and output ports, thereby constituting a data transfer network in the form of a grid. As shown in FIG. 16B, the switch EX100 has input/output ports IP100/OP100 for connection with the processor PE100, and input/output ports IP100/OP100, IW100/OW100, IS100/OS100, IE100/OE100 for connection with the four surrounding switches. Also in this embodiment, similarly to the foregoing embodiments, a packet to be transferred between the processors is divided into a train of subpackets each having the number of bits equal to a bit width d of the data transfer path. This embodiment is different from other embodiments in that the target address in the packet is divided into two upper and lower parts each having the number of bits not larger than d−1 bits, the divided upper and lower parts of the target address being used as a global address AG and a local address AL which are loaded in separate subpackets, respectively, and that the first subpacket includes a flag bit L indicating whether the partial address loaded in the first subpacket is AG or AL. For the sake of simplicity, it is here assumed that d is equal to 4 and AG, AL have each 3 bits. As shown in FIG. 17, 64 processors uniquely represented by total 6 bits of AG plus AL are interconnected through the switches. These processors are grouped into 8 clusters each of which includes 8 processors. A respective switch used in this embodiment can be configured as shown in FIG. 20 by modifying the switch such as shown in FIG. 7A or 12 to be adapted for 5 input ports/5 output ports. The respective parts and symbols in FIG. 20 are similar in their operations and meanings to those beginning with the same English character(s) in FIG. 7A. The configuration of FIG. 20 is different from that of FIG. 17A in that a set circuit X21 for the flag bit L is provided between registers L21, L22 for storing the partial addresses and a selector S31. The set circuit X21 sets the flag bit L in response to a set signal XC21 from a switch controller P21. Operation of the switches will now be described. Note that the parts indicated by R22–R25 in FIG. 20 have each the similar configuration to that of the part indicated by R21, and hence their diagrams are omitted in those parts for the sake of simplicity. At the start of transmitting data, each processor places AG in the first subpacket and sets the L bit equal to 0. The processing procedure effected by each switch is shown in FIG. 19. Since the L bit is provided in this embodiment, it is not necessary for each switch to refer the local address AL as long as L=0 is set. Thus, each switch can determine the succeeding switch to which the packet is to be sent therefrom, without the need of waiting for arrival of all the subpackets including the respective partial target addresses divided as mentioned above. When the packet is transferred through the switches and enters a certain switch belonging to the cluster whose global address is equal to that of the target processor, that switch waits for arrival of the subpacket including the local address AL, exchanges AL and AG in a like manner to the case of FIG. 7A so that the local address is now placed in the first subpacket, and delivers the packet to the succeeding stage after setting L=1. Therefore, any of following switches can determine the succeeding switch to which the packet is to be sent, without the need of waiting for arrival of the second subpacket including the global address.

With respective processors having their addresses as shown in FIG. 17, it is now supposed that the packet is sent from the processor NS with AG=000 and AL=110 to the processor NR with AG=110 and AL=110. Here, each switch storing therein the local addresses of the adjacent processors and the global addresses of the adjacent clusters, as well as its own address, compares the global address AG in the packet with its own global address as long as L=0 is set, and if they are different from each other, then compares it with any of the global addresses of the adjacent clusters for determining the direction and the output port for further transfer of the packet. With the simplest algorithm, the packet is delivered in the direction in which the difference between the two global addresses is minimized. According to this algorithm, the packet advances following the route as indicated in FIG. 17 and reaches the switch at a position (AG=110, AL=000) indicated by NX. The switch at NX exchanges AL and AG in a like manner to that of FIG. 7A and then delivers the packet to the succeeding stage after setting L=1. After that, each of the succeeding switches can compare the local address in the packet with any of the local addresses of the adjacent processors and determine the direction and the output port for transfer of the packet in accordance with the similar algorithm as mentioned above. In this embodiment, only the switch at NX is required to wait for arrival of the two subpackets including AG and AL, while the waiting time necessary for other switches to wait for arrival of the target address is a half that necessary for the case without resorting to the present invention. Thus, the effect of this embodiment is very valuable particularly in case of using a larger number of processors.

Although AG and AL have been described as each having 3 bits, the effect of the present invention will remain unchanged even with AG and AL set to have any desired number of bits.

While the target address was divided into two partial addresses, the effect of the present invention will remain unchanged even if the number of partial addresses is increased and the above L is given by plural bits. Further, while each switch in the data network was connected to four surrounding switches, the effect of the present invention will remain unchanged even if it is connected to any desired number of surrounding switches.

Although the destination of data packet has been described in the foregoing embodiment as being represented by the target address included in the first two or more subpackets, it will be apparent that the destination may be represented by equivalent tag information indicative of the same target address. For example, such tag information can be given by EXCLUSIVE OR between the address of the source processor and the target address.

As described above, according to the present invention, each of a plurality of multi-staged switches is not required to wait for arrival of all the plural subpackets including the target address, with the result that data can be transferred at a higher speed.

What is claimed is:

1. A data transfer network for transferring data between a plurality of processors, comprising:
  (a) a first group of partial network means each for transferring data among processors belonging to a corresponding one of first processor groups, within the plurality of processors, each of the plurality of processors being assigned with an address switch comprises first and second address portions, each of the first processor group comprising processors whose addresses differ in first address portion and are same in second address portion, each partial network means having:
    first input terminals each for receiving data from a corresponding processor belonging to one group within the first processor groups, corresponding to the partial network means;
    first output terminals each for providing data to a corresponding processor belonging to the corresponding one group, within the first processor groups; and
    first transfer means for concurrently transferring different data received at ones of the first input terminals to ones of the first output terminals;
    said first transfer means comprising first plural switch means connected in multistages, each of said first plural switch means transferring data received at ones of first input terminals provided in the first switch means to ones of first output terminals provided in the first switch means, the first input terminals of part of the first plural switch means being used as the first input terminals of the partial network means;

(b) a second group of partial network means each for transferring data among processors belonging to a corresponding one of second processor groups, within the plurality of processors, each group of the second processor groups comprising processors whose addresses differ in second address portions and are same in first address portions and each partial network means having:

second input terminals each for receiving data from a corresponding processor belonging to one group within the second processor groups, corresponding to the partial network means;

second output terminals each for providing data to a corresponding processor belonging to the corresponding one group, within the second processor groups; and second transfer means for concurrently transferring different data received at ones of the second input terminals to ones of the second output terminals;

said second transfer means comprising second plural switch means connected in multi-stages, each of said second plural switch means transferring data received at ones of second input terminals provided in the second switch means to ones of second output terminals provided in the second switch means, the second input terminals of part of the second plural switch means being used as the second input terminals of the partial network means.

2. A data transfer network according to claim 1, further comprising a plurality of pass switch means, each pass switch means being connected to a corresponding one processor within said plurality of processors, connected to a first one partial network means within said first group of partial network means, corresponding to one of the first processor groups, to which one group the corresponding one processor belongs and further connected to a second one partial network means withibn said second group of partial network means, corresponding to one of the second processor groups, to which one the corresponding one processor belongs, the pass switch means transferring data provided by the corresponding processor to a selected one of said first and second partial network means, transferring data received from said first partial network means to a selected one of said corresponding processor and said second partial network means, and transferring data received from said second partial network means to a selected one of said corresponding processor and said first partial network means.

3. A data transfer network for transferring data between a plurality of processors, comprising:

(a) a first group of partial network means each for transferring data among processors belonging to a corresponding one of first processor groups, within the plurality of processors, each of the plurality of processors being assigned with an address which comprises first, second and third address portions, each group of the first processor groups comprising processors whose addresses differ in first address portions and are same in second and third address portions and each partial network means having;

first input terminals each for receiving data from a corresponding processor belonging to one group within the first processor groups, corresponding to the partial network means;

first output terminals each for providing data to corresponding processor belonging to the corresponding one group, within the first processor groups; and first transfer means for concurrently transferring different data received at ones of the fist input terminals to ones of the first output terminals;

said first transfer means comprising first plural switch means connected in multistages, each of said first plural switch means transferring data received at ones of first input terminals provided in the first switch means to ones of first output terminals provided in the first switch means, the first input terminals of part of the first plural switch means being used as the first input terminals of the partial network means;

(b) a second group of partial network means each for transferring data among processors belonging to a corresponding one of second processor groups, within the plurality of processors, each group of the second processor groups comprising processors whose addresses differ in second address portions and are same in second and third address portions and each partial network means having;

second input terminals each for receiving data from a corresponding processor belonging to one group within the second processor groups, corresponding to the partial network means;

second output terminals each for providing data to a corresponding processor belonging to the corresponding one group, within the second processor groups; and second transfer means for concurrently transferring different data received at ones of the second input terminals to ones of the second output terminals;

said second transfer means comprising second plural switch means connected in multi-stages, each of said second plural switch means transferring data received at ones of second input terminals provided in the second switch means to ones of second output terminals provided in the second switch means, the second input terminals of part of the second plural switch means being used as the second input terminals of the partial network means;

(c) a third group of partial network means each for transferring data among processors belonging to a corresponding one of third processor groups, within the plurality of processors, each group of the third processor groups comprising processors whose addresses differ in third address portions and are same in first and second address portions and each partial network means having;

third input terminals each for receiving data from a corresponding processor belonging to one group within the third processor groups, corresponding to the partial network means;

third output terminals each for providing data to a corresponding processor belonging to the corresponding one group, within the third processor groups; and third transfer means for concurrently transferring different data received at ones of the third input terminals to ones of the third output terminals;

said third transfer means comprising third plural switch means connected in multistages, each of said third plural switch means transferring data received at ones of third input terminals provided in the third switch means to ones of third output terminals provided in the third switch means, the third input terminals of part of the third plural switch means being used as the third input terminals of the partial network means.

4. A data transfer network means according to claim 3, further comprising a plurality of pass switch means, each pass switch means being connected to a corresponding one processor within said plurality of processors, connected to a first one partial network means within said first group of partial network means, corresponding to one of first processor groups, to which one group the corresponding one processor belongs, further connected to a second one partial network means within said second group of partial network means, corresponding to one of the second processor groups, to which one the corresponding one processor belongs, and further connected to a third one partial network means within said third group of partial network means, corresponding to one of the second processor groups, to which one the corresponding one processor belongs, the pass switch means transferring data provided by the corresponding processor to a selected one of said first to third partial network means, transferring data received from said first partial network means to a selected one of said corresponding processor and said second and third partial network means, transferring data received from said second partial network means to selected one of said corresponding processor and said first and third partial network means, and transferring data received from said third partial network means to a selected one of said corresponding processor and said first and second partial network means.

5. A data transfer network for transferring data between a plurality of processors, comprising:

plural (n) groups of partial network means, i-th ($1 \leq i \leq n$) group thereof transferring data among processors belonging to a corresponding one of i-th ($1 \leq i \leq n$) processor groups, within the plurality of processors, each of the plurality of processors being assigned with an address which comprises plural (n) address portions each group of the i-th processor groups comprising processors whose addresses differ in i-th address portions and are the same in other address portions, wherein each partial network means of the i-th group includes i-th input terminals each for receiving data from a corresponding processor belonging to one group within the i-th processor groups, corresponding to the partial network means;

i-th output terminals each for providing data to a corresponding processor belonging to the corresponding one group, within the i-th processor groups; and i-th transfer means for concurrently transferring different data received at ones of the i-th input terminals to ones of the i-th output terminals;

said i-th transfer means comprising i-th plural switch means connected in multi-stages, each of said i-th plural switch means transferring data received at ones of i-th input terminals provided in the i-th switch means to ones of i-th output terminals provided in the i-th switch means, the i-th input terminals of part of the i-th plural switch means being used as the i-th input terminals of the partial network means.

6. A data transfer network according to claim 5, further comprising a plurality of pass switch means, each pass switch means, being connected to a corresponding one processor within said plurality of processors and connected to first to n-th partial network means, i-th ($1 \leq i \leq n$) partial network means being within said i-th group of partial network means, corresponding to one of the i-th processor groups, to which one group the corresponding one processor belongs the pass switch means transferring data provided by the corresponding processor to a selected one of said first to n-th partial network means, transferring data received from said i-th partial network means to a selected one of said corresponding processor and plural ($n-1$) partial network means other than said i-th partial network means within said first to n-th partial network means.

* * * * *